(12) United States Patent
Huang et al.

(10) Patent No.: US 11,553,485 B2
(45) Date of Patent: *Jan. 10, 2023

(54) METHOD AND APPARATUS FOR INDICATING SLOT FORMAT OF AN UNLICENSED CELL IN A WIRELESS COMMUNICATION SYSTEM

(71) Applicant: ASUSTek Computer Inc., Taipei (TW)

(72) Inventors: Chun-Wei Huang, Taipei (TW); Jia-Hong Liou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/477,510

(22) Filed: Sep. 16, 2021

(65) Prior Publication Data

US 2022/0007361 A1     Jan. 6, 2022

Related U.S. Application Data

(63) Continuation of application No. 16/527,777, filed on Jul. 31, 2019, now Pat. No. 11,153,872.

(60) Provisional application No. 62/714,415, filed on Aug. 3, 2018, provisional application No. 62/712,597, filed on Jul. 31, 2018.

(51) Int. Cl.
*H04W 72/04* (2009.01)
*H04W 24/08* (2009.01)
*H04W 16/14* (2009.01)
*H04L 5/00* (2006.01)
*H04L 5/10* (2006.01)
*H04W 74/08* (2009.01)

(52) U.S. Cl.
CPC ....... *H04W 72/0446* (2013.01); *H04L 5/0007* (2013.01); *H04L 5/0051* (2013.01); *H04L 5/10* (2013.01); *H04W 16/14* (2013.01); *H04W 24/08* (2013.01); *H04W 72/042* (2013.01); *H04W 74/0808* (2013.01)

(58) Field of Classification Search
CPC ............................. H04W 72/04; H04W 74/08
See application file for complete search history.

(56) References Cited

U.S. PATENT DOCUMENTS

2019/0191322 A1* 6/2019 Sun ........................ H04L 5/1469

* cited by examiner

*Primary Examiner* — Sulaiman Nooristany

(74) *Attorney, Agent, or Firm* — Skaar Ulbrich Macari, P.A.

(57) ABSTRACT

A method and apparatus are disclosed from the perspective of a User Equipment (UE). In one embodiment, the method includes the UE performing transmission and/or reception in a serving cell, wherein the serving cell is in unlicensed spectrum. The method further includes the UE being configured to receive slot format indication (SFI) on periodic SFI monitoring occasion(s), wherein periodic SFI monitoring occasion(s) is (pre-)configured by a network. The method also includes the UE, in response to receiving and/or detecting a channel indicator, monitoring and/or detecting a first SFI-related signal on a first occasion, wherein the first occasion is not one of (pre-)configured periodic SFI monitoring occasion(s).

16 Claims, 29 Drawing Sheets

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |

FIG. 5A (PRIOR ART)

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| ... | ... | ... | ... | ... | ... | ... | ... | ... | ... | ... | ... | ... | ... | ... |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56 – 254 | Reserved | | | | | | | | | | | | | |
| 255 | UE determines the slot format for the slot based on tdd-UL-DL-ConfigurationCommon, tdd-UL-DL-ConfigurationCommon2, or tdd-UL-DL-ConfigDedicated and, if any, on detected DCI formats | | | | | | | | | | | | | |

FIG. 5B (PRIOR ART)

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

FIG. 8 (PRIOR ART)

| Channel Access Priority Class ($p$) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127,255,511,1023} |

FIG. 9 (PRIOR ART)

METHOD AND APPARATUS FOR INDICATING SLOT FORMAT OF AN UNLICENSED CELL IN A WIRELESS COMMUNICATION SYSTEM

CROSS-REFERENCE TO RELATED APPLICATIONS

The present application is a continuation of U.S. patent application Ser. No. 16/527,777, filed Jul. 31, 2019, which claims priority to and the benefit of U.S. Provisional Patent Application Ser. No. 62/712,597, filed Jul. 31, 2018, and U.S. Provisional Patent Application Ser. No. 62/714,415, filed Aug. 3, 2018; with the entire disclosures of each referenced application fully incorporated herein by reference.

FIELD

This disclosure generally relates to wireless communication networks, and more particularly, to a method and apparatus for indicating slot format of an unlicensed cell in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a User Equipment (UE). In one embodiment, the method includes the UE performing transmission and/or reception in a serving cell, wherein the serving cell is in unlicensed spectrum. The method further includes the UE being configured to receive slot format indication (SFI) on periodic SFI monitoring occasion(s), wherein periodic SFI monitoring occasion(s) is (pre-)configured by a network. The method also includes the UE, in response to receiving and/or detecting a channel indicator, monitoring and/or detecting a first SFI-related signal on a first occasion, wherein the first occasion is not one of (pre-)configured periodic SFI monitoring occasion(s).

BRIEF DESCRIPTION OF THE DRAWINGS

FIGS. 5A and 5B are a reproduction of Table 11.1.1-1 of 3GPP TS 38.213 V15.2.0.

FIG. 8 is a reproduction of Table 7.3.1-1 of 3GPP TS 38.212 v15.2.0.

FIG. 9 is a reproduction of Table 15.1.1-1 of 3GPP TS 36.213 v15.1.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.213 V15.2.0, "Physical layer procedures for control"; TS 38.211 V15.2.0, "Physical channels and modulation"; Final Report of 3GPP TSG RAN WG1 #AH 1801 v1.0.0 (Vancouver, Canada, 22-26 Jan. 2018); Final Report of 3GPP TSG RAN WG1 #92 v1.0.0 (Athens, Greece, 26 Feb.-2 Mar. 2018); Final Report of 3GPP TSG RAN WG1 #92bis v1.0.0 (Sanya, China, 16-20 Apr. 2018); Draft Report of 3GPP TSG RAN WG1 #93 v0.2.0 (Busan, South Korea, 21-25 May 2018); TS 38.331 V15.2.0, "Radio Resource Control (RRC) protocol specification"; R1-1807386, "TxOP Frame Structure for NR unlicensed", Qualcomm Incorporated; R1-1806105, "Frame structure for NR-U operation", Nokia, Nokia Shanghai Bell; TS 38.212 V15.2.0, "Multiplexing and channel coding"; TS 36.213 v15.1.0, "Physical layer procedures"; and TS 37.213 v15.0.0, "Physical layer procedures for shared spectrum channel access". The standards and documents listed above are hereby expressly incorporated by reference in their entirety.

Figure 1:
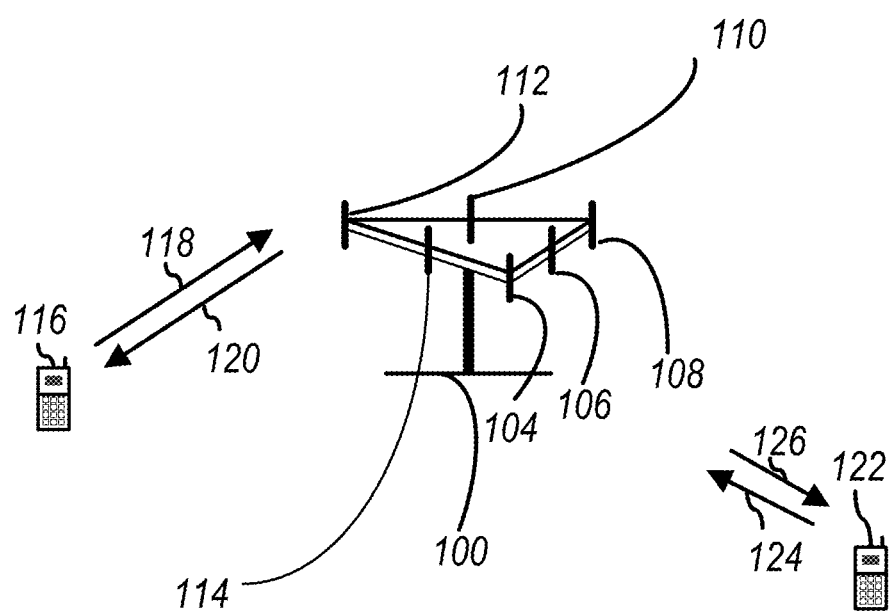
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
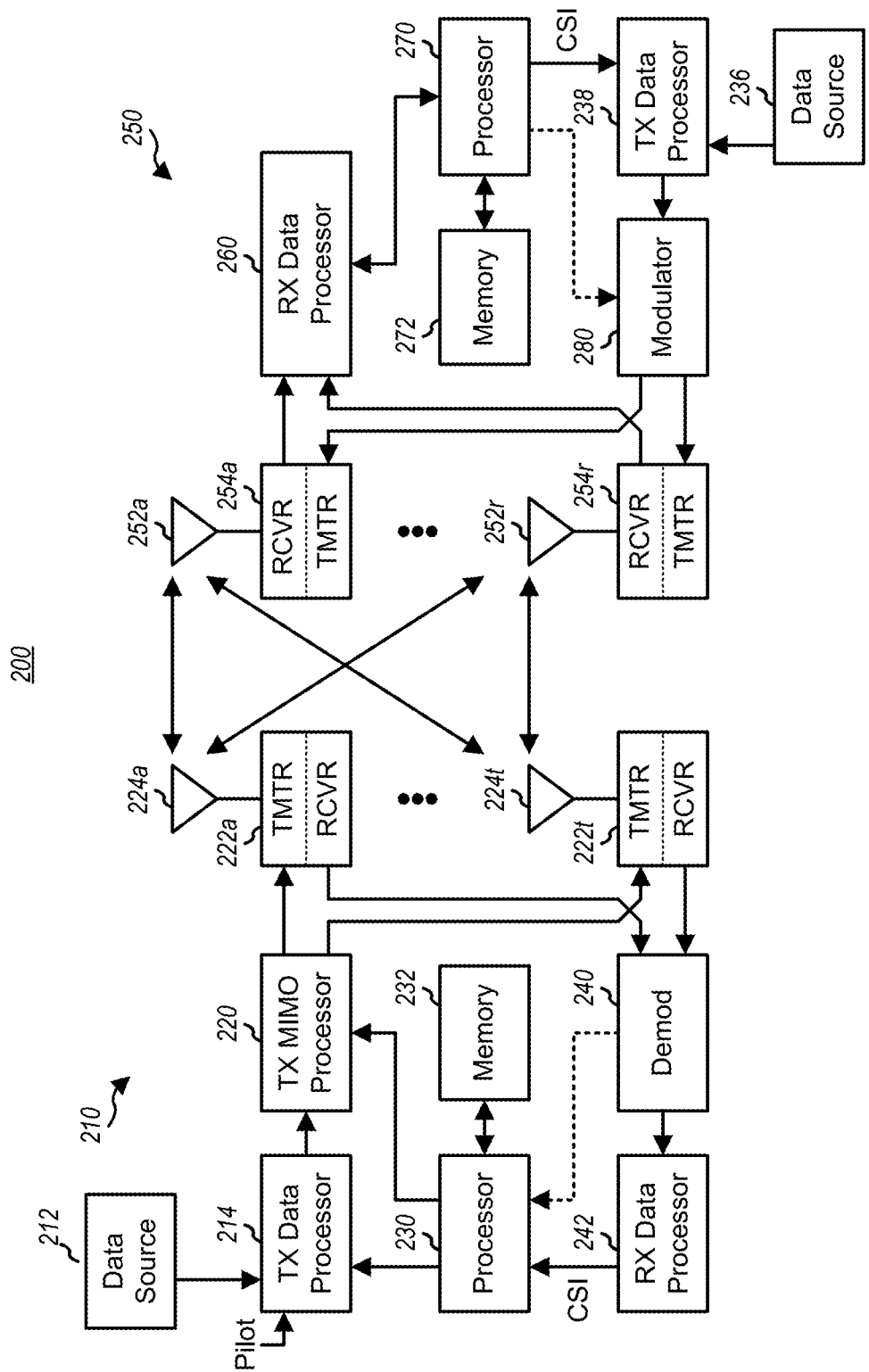
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
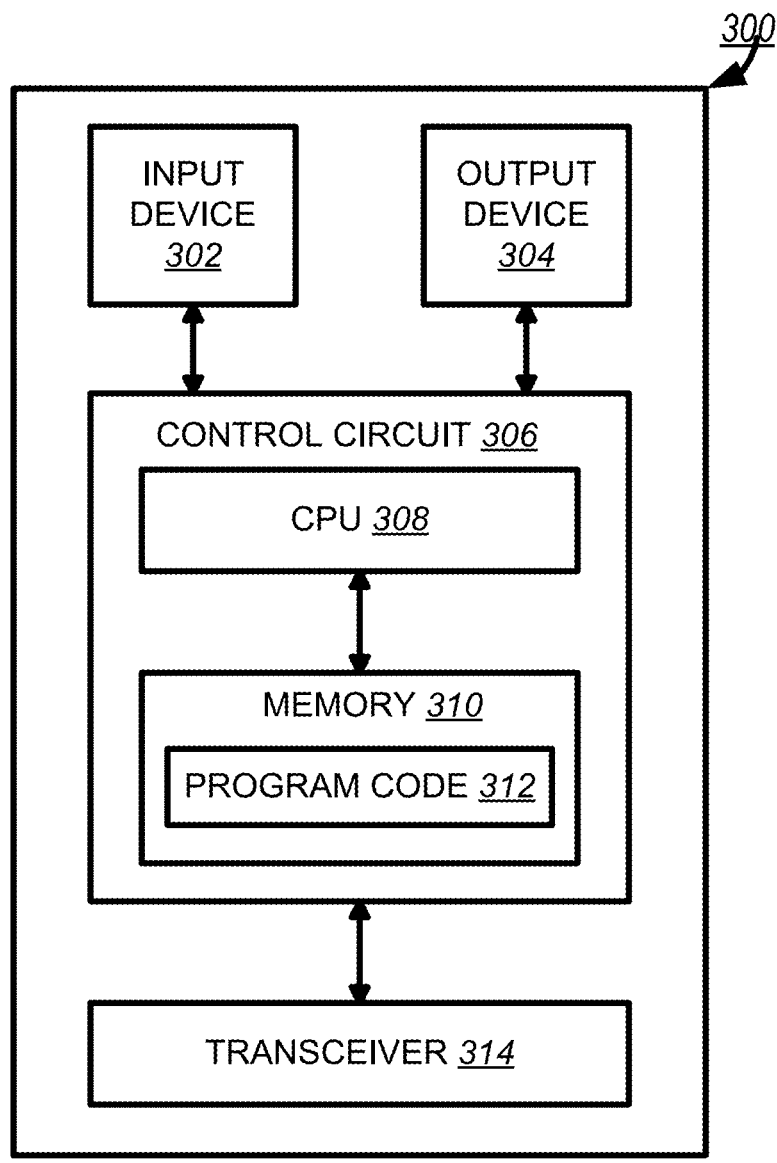
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
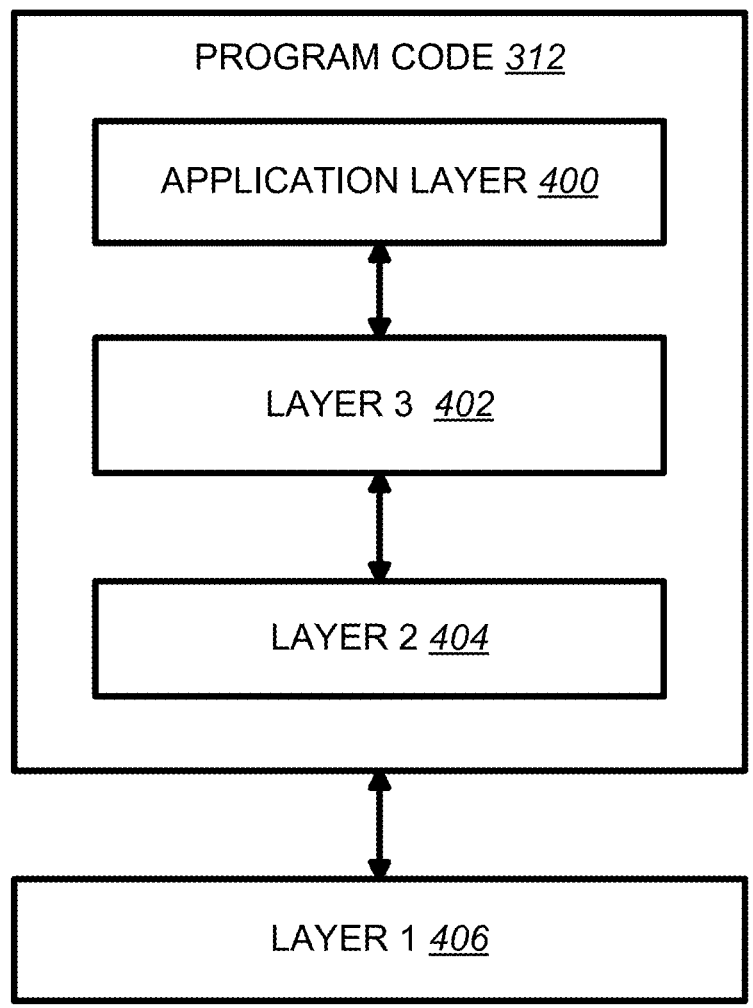
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.213 describes the following procedures for PDCCH monitoring, slot format, frame structure, bandwidth part (BWP), and some abbreviation. A slot format value could be 0 to 255 indicating an entry of Table 11.1.1-1 of 3GPP TS 38.213 V15.2.0 (reproduced as FIGS. 5A and 5B). A slot format value could indicate a slot format of a slot with normal cyclic prefix.

10 UE Procedure for Receiving Control Information 10.1 UE Procedure for Determining Physical Downlink Control Channel Assignment For each DL BWP configured to a UE in a serving cell, a UE can be provided by higher layer signalling with P≤3 control resource sets. For each control resource set, the UE is provided the following by higher layer parameter ControlResourceSet:

a control resource set index p, 0≤p<12, by higher layer parameter controlResourceSetId;

a DM-RS scrambling sequence initialization value by higher layer parameter pdcch-DMRS-ScramblingiD;

a precoder granularity for a number of REGs in the frequency domain where the UE can assume use of a same DM-RS precoder by higher layer parameter precoderGranularity;

a number of consecutive symbols provided by higher layer parameter duration;

a set of resource blocks provided by higher layer parameter frequencyDomainResources;

CCE-to-REG mapping parameters provided by higher layer parameter cce-REG-MappingType;

an antenna port quasi co-location, from a set of antenna port quasi co-locations provided by higher layer parameter TCI-StatesPDCCH, indicating quasi co-location information of the DM-RS antenna port for PDCCH reception;

an indication for a presence or absence of a transmission configuration indication (TCI) field for DCI format 1_1 transmitted by a PDCCH in control resource set p, by higher layer parameter TCI-PresentInDCI.

For each DL BWP configured to a UE in a serving cell, the UE is provided by higher layers with S≤10 search space sets where, for each search space set from the s search space sets, the UE is provided the following by higher layer parameter SearchSpace:

a search space set index s, 0≤s<40, by higher layer parameter searchSpaceId;

an association between the search space set s and a control resource set p by higher layer parameter controlResourceSetId;

a PDCCH monitoring periodicity of $k_{p,s}^-$ candidates for DCI format 2_0 and a corresponding CCE aggregation level;

an indication by higher layer parameter dci-Format2-1 to monitor PDCCH candidates for DCI format 2_1;

an indication by higher layer parameter dci-Format2-2 to monitor PDCCH candidates for DCI format 2_2;

an indication by higher layer parameter dci-Format2-3 to monitor PDCCH candidates for DCI format 2_3;

if search space set s is a UE-specific search space set, an indication by higher layer parameter dci-Formats to monitor PDCCH candidate either for DCI format 0_0 and DCI format 1_0, or for DCI format 0_1 and DCI format 1_1.

If the higher layer parameter monitoringSymbolsWithinSlot indicates to a UE only one PDCCH monitoring occasion within a slot, the UE does not expect to be configured with a PDCCH subcarrier spacing other than 15 kHz for the corresponding search space set s if the control resource set p associated with the search space s includes at least one symbol after the third symbol of the slot.

A PDCCH UE-specific search space at CCE aggregation level L∈{1, 2, 4, 8, 16} is defined by a set of PDCCH candidates for CCE aggregation level L.

If a UE is configured with higher layer parameter CrossCarrierSchedulingConfig for a serving cell the carrier indicator field value corresponds to the value indicated by CrossCarrierSchedulingConfig.

For a DL BWP of a serving cell on which a UE monitors PDCCH candidates in a UE-specific search space, if the UE is not configured with a carrier indicator field, the UE monitors the PDCCH candidates without carrier indicator field. For a serving cell on which a UE monitors PDCCH candidates in a UE-specific search space, if a UE is configured with a carrier indicator field, the UE monitors the PDCCH candidates with carrier indicator field.

A UE is not expected to monitor PDCCH candidates on a DL BWP of a secondary cell if the UE is configured to monitor PDCCH candidates with carrier indicator field corresponding to that secondary cell in another serving cell. For the DL BWP of a serving cell on which the UE monitors PDCCH candidates, the UE monitors PDCCH candidates at least for the same serving cell.

11 UE-Group Common Signalling

11.1 Slot Configuration

A slot format includes downlink symbols, uplink symbols, and flexible symbols.

For each serving cell

If a UE is provided higher layer parameter tdd-UL-DL-ConfigurationCommon and the UE is not provided higher layer parameter tdd-UL-DL-ConfigurationCommon2, the UE sets the slot format per slot over a number of slots as indicated by higher layer parameter tdd-UL-DL-Configuration Common.

The higher layer parameter tdd-UL-DL-Configuration-Common provides

A reference subcarrier spacing $\mu_{ref}$ by higher layer parameter referenceSubcarrierSpacing A slot configuration period of P msec by higher layer parameter dl-UL-TransmissionPeriodicity A number of slots $d_{slots}$ with only downlink symbols by higher layer parameter nrofDownlinkSlots A number of downlink symbols $d_{sym}$ by higher layer parameter nrofDownlinkSymbols A number of slots $u_{slots}$ with only uplink symbols by higher layer parameter nrofUplinkSlots A number of uplink symbols $u_{sym}$ by higher layer parameter nrofUplinkSymbols A value P=0.625 msec is valid only for $\mu_{ref}=3$. A value P=1.25 msec is valid only for $\mu_{ref}=2$ or $\mu_{ref}=3$. A value P=2.5 msec is valid only for $\mu_{ref}=1$, or $\mu_{ref}=2$, or $\mu_{ref}=3$.

A slot configuration period of P msec includes $S=P\cdot 2^{\mu_{ref}}$ slots with $\mu_{ref}$ subcarrier spacing. From the S slots, a first $d_{slots}$ slots include only downlink symbols and a last $u_{slots}$ slots include only uplink symbols. The $d_{sym}$ symbols after the first $d_{slots}$ slots are downlink symbols. The $u_{sym}$ symbols before the last $u_{slots}$ slots are uplink symbols. The remaining $(S-d_{slots}-u_{slots})\cdot N_{symb}^{slot}-d_{sym}-u_{sym}$ are flexible symbols.

The first symbol every 20/P periods is a first symbol in an even frame.

A UE expects that the reference subcarrier spacing $\mu_{ref}$ is smaller than or equal to the subcarrier spacing for any of the configured DL BWP or UL BWP.

If the UE is provided higher layer parameters tdd-UL-DL-ConfigurationCommon and tdd-UL-DL-ConfigurationCommon2, the UE sets the slot format per slot over a first number of slots as indicated by higher layer parameter tdd-UL-DL-ConfigurationCommon and the UE sets the slot format per slot over a second number of slots as indicated by tdd-UL-DL-ConfigurationCommon2.

The higher layer parameter tdd-UL-DL-Configuration-Common2 provides

A reference subcarrier spacing $\mu_{ref,2}$ by higher layer parameter referenceSubcarrierSpacing;

A slot configuration period of $P_2$ msec by higher layer parameter dl-UL-TransmissionPeriodicity;

A number of slots $d_{slots,2}$ with only downlink symbols by higher layer parameter nrofDownlinkSlots;

A number of downlink symbols $d_{sym,2}$ by higher layer parameter nrofDownlinkSymbols;

A number of slots $u_{slots,2}$ with only uplink symbols by higher layer parameter nrofUplinkSlots;

A number of uplink symbols $u_{sym,2}$ by higher layer parameter nrofUplinkSymbols.

A UE expects $\mu_{ref,2}=\mu_{ref}$.

A value $P_2=0.625$ msec is valid only for $\mu_{ref,2}=3$. A value $P_2=1.25$ msec is valid only for $\mu_{ref,2}=2$ or $\mu_{ref,2}=3$. A value $P_2=2.5$ msec is valid only for $\mu_{ref,2}=2$, or $\mu_{ref,2}=3$.

A slot configuration period of $P+P_2$ slots includes first $S=P\cdot 2^{\mu_{ref}}$ slots and second $S_2=P_2\cdot 2^{\mu_{ref}}$ slots. From the $S_2$ slots, a first $d_{slots,2}$ slots include only downlink symbols and a last $u_{slots,2}$ include only uplink symbols. The $d_{sym,2}$ symbols after the first $d_{slots,2}$ slots are downlink symbols. The $u_{sym,2}$ symbols before the last $u_{slots,2}$ slots are uplink symbols. The remaining $(S_2-d_{slot,2}-u_{slots,2})\cdot N_{symb}^{slot}-d_{sym,2}-u_{sym,2}$ are flexible symbols.

A UE expects that $P+P_2$ divides 20 msec.

The first symbol every $20/(P+P_2)$ periods is a first symbol in an even frame.

If the UE is additionally provided higher layer parameter tdd-UL-DL-ConfigDedicated, the parameter tdd-UL-DL-ConfigDedicated overrides only flexible symbols per slot over the number of slots as provided by tdd-UL-DL-ConfigurationCommon or tdd-UL-DL-ConfigurationCommon2.

For each slot having a corresponding index provided by higher layer parameter slotIndex, the UE applies a format provided by the corresponding higher layer parameter symbols. The UE does not expect tdd-UL-DL-ConfigDedicated to indicate as uplink or as downlink a symbol that tdd-UL-DL-Configuration Common or, when provided, tdd-UL-DL-ConfigurationCommon2 indicates as a downlink or as an uplink symbol, respectively.

For each slot configuration provided by tdd-UL-DL-ConfigDedicated, a reference subcarrier spacing is the reference subcarrier spacing $\mu_{ref}$ provided by tdd-UL-DL-ConfigurationCommon.

A UE considers symbols in a slot indicated as downlink by higher layer parameters tdd-UL-DL-ConfigurationCommon, tdd-UL-DL-ConfigurationCommon2, or tdd-UL-DL-ConfigDedicated to be available for receptions and considers symbols in a slot indicated as uplink by higher layer parameters tdd-UL-DL-ConfigurationCommon, tdd-UL-DL-ConfigurationCommon2, or by tdd-UL-DL-ConfigDedicated to be available for transmissions.

If a UE is not configured to monitor PDCCH for DCI format 2-0, for a set of symbols of a slot that are indicated as flexible by higher layer parameters tdd-UL-DL-ConfigurationCommon, tdd-UL-DL-ConfigurationCommon2, or tdd-UL-DL-ConfigDedicated, when provided to a UE, or when tdd-UL-DL-Configuration Common, tdd-UL-DL-ConfigurationCommon2, and tdd-UL-DL-ConfigDedicated are not provided to the UE.

The UE receives PDSCH or CSI-RS in the set of symbols of the slot if the UE receives a corresponding indication by a DCI format 1_0, DCI format 1_1, or DCI format 0_1.

The UE transmits PUSCH, PUCCH, PRACH, or SRS in the set of symbols of the slot if the UE receives a corresponding indication by a DCI format 0_0, DCI format 0_1, DCI format 1_0, DCI format 1_1, or DCI format 2_3.

If the UE is configured by higher layers to receive a PDCCH, or a PDSCH, or a CSI-RS in the set of symbols of the slot, the UE receives the PDCCH, the PDSCH, or the CSI-RS if the UE does not detect a DCI format 0_0, DCI format 0_1, DCI format 1_0, DCI format 1_1, or DCI format 2_3 that indicates to the UE to transmit a PUSCH, a PUCCH, a PRACH, or a SRS in the set of symbols of the slot, or the UE detects a DCI format 0_0, DCI format 0_1, DCI format 1_0, DCI format 1_1, or DCI format 2_3 that indicates to the UE to transmit a PUSCH, a PUCCH, a PRACH, or a SRS in the set of symbols of the slot and a number of symbols between a last symbol of a control resource set where the UE detects the DCI format 0_0, DCI format 0_1, DCI format 1_0, DCI format 1_1, or DCI format 2_3 and a first symbol in the set of symbols is smaller than the PUSCH preparation time $N_2$ for the corresponding PUSCH timing capability [6, TS 38.214].

Otherwise, the UE does not receive the PDCCH, or the PDSCH, or the CSI-RS in the set of symbols of the slot.

If the UE is configured by higher layers to transmit a periodic SRS, or a PUCCH, or a PUSCH, or a PRACH in the set of symbols in the slot, the UE transmits the periodic SRS, or the PUCCH, or the PUSCH, or the PRACH in the set of symbols of the slot if
- the UE does not detect a DCI format 1_0, DCI format 1_1, or DCI format 0_1 that indicates to the UE to receive PDSCH or CSI-RS in the set of symbols in the slot, or
- the UE detects a DCI format 1_0, DCI format 1_1, or DCI format 0_1 that indicates to the UE to receive PDSCH or CSI-RS in the set of symbols in the slot and a number of symbols between a last symbol of a control resource set where the UE detects the DCI format 1_0 or DCI format 1_1 and a first symbol in the set of symbols is smaller than the PUSCH preparation time $N_2$ for the corresponding PUSCH timing capability.

Otherwise, the UE does not transmit the periodic SRS, or the PUCCH, or the PUSCH, or the PRACH in the set of symbols of the slot.

For a set of symbols of a slot that are indicated to a UE as uplink by higher layer parameters tdd-UL-DL-Configuration Common, tdd-UL-DL-ConfigurationCommon2, or tdd-UL-DL-ConfigDedicated, when provided to the UE, the UE does not receive PDCCH, PDSCH, or CSI-RS in the set of symbols of the slot.

For a set of symbols of a slot that are indicated to a UE as downlink by higher layer parameters tdd-UL-DL-Configuration Common, or tdd-UL-DL-ConfigurationCommon2, or tdd-UL-DL-ConfigDedicated, when provided to the UE, the UE does not transmit PUSCH, PUCCH, PRACH, or SRS in the set of symbols of the slot.

For a set of symbols of a slot that are indicated to a UE as flexible by higher layer parameters tdd-UL-DL-Configuration Common, or tdd-UL-DL-ConfigurationCommon2, or tdd-UL-DL-ConfigDedicated, when provided to the UE, the UE does not expect to receive both dedicated higher layer parameters configuring transmission from the UE in the set of symbols of the slot and dedicated higher layer parameters configuring reception by the UE in the set of symbols of the slot.

If a UE is scheduled by a DCI format 1_1 to receive PDSCH over multiple slots, and if higher layer parameters tdd-UL-DL-ConfigurationCommon, tdd-UL-DL-ConfigurationCommon2, or tdd-UL-DL-ConfigDedicated, when provided to the UE, indicate that, for a slot from the multiple slots, at least one symbol from a set of symbols where the UE is scheduled PDSCH reception in the slot is an uplink symbol, the UE does not receive the PDSCH in the slot.

If a UE is scheduled by a DCI format 0_1 to transmit PUSCH over multiple slots, and if higher layer parameter tdd-UL-DL-ConfigurationCommon, tdd-UL-DL-Configuration-Common2, or tdd-UL-DL-ConfigDedicated, when provided to a UE, indicates that, for a slot from the multiple slots, at least one symbol from a set of symbols where the UE is scheduled PUSCH transmission in the slot is a downlink symbol, the UE does not transmit the PUSCH in the slot.

11.1.1 UE Procedure for Determining Slot Format

This subclause applies for a serving cell that is included in a set of serving cells configured to a UE by higher layer parameters slotFormatCombToAddModList and slotFormatCombToReleaseList.

If a UE is configured by higher layers with parameter SlotFormatIndicator, the UE is provided with a SFI-RNTI by higher layer parameter sfi-RNTI and with a payload size of DCI format 2_0 by higher layer parameter dci-PayloadSize. The UE is also provided in one or more serving cells with a configuration for a search space set s and a corresponding control resource set p for monitoring $M_{p,s}^{(L_{SFI})}$ PDCCH candidates for DCI format 2_0 with a CCE aggregation level of $L_{SFI}$ CCEs as described in Subclause 10.1. The $M_{p,s}^{(L_{SFI})}$ PDCCH candidates are the first $M_{p,s}^{(L_{SFI})}$ PDCCH candidates for CCE aggregation level $L_{SFI}$ for search space set s in control resource set p.

For each serving cell in the set of serving cells, the UE can be provided:
- an identity of the serving cell by higher layer parameter servingCellId
- a location of a SFI-index field in DCI format 2_0 by higher layer parameter positionInDCI
- a set of slot format combinations by higher layer parameter slotFormatCombinations, where each slot format combination in the set of slot format combinations includes
  - one or more slot formats indicated by a respective higher layer parameter slotFormats for the slot format combination, and
  - a mapping for the slot format combination provided by slotFormats to a corresponding SFI-index field value in DCI format 2_0 provided by higher layer parameter slotFormatCombinationId
- for unpaired spectrum operation, a reference subcarrier spacing $\mu_{SFI}$ by higher layer parameter subcarrierSpacing and, when a supplementary UL carrier is configured for the serving cell, a reference subcarrier spacing $\mu_{SFI,SUL}$ by higher layer parameter subcarrierSpacing2 for the supplementary UL carrier
- for paired spectrum operation, a reference subcarrier spacing $\mu_{SFI,DL}$ for a DL BWP by higher layer parameter subcarrierSpacing and a reference subcarrier spacing $\mu_{SFI,UL}$ for an UL BWP by higher layer parameter subcarrierSpacing2

A SFI-index field value in a DCI format 2_0 indicates to a UE a slot format for each slot in a number of slots for each DL BWP or each UL BWP starting from a slot where the UE detects the DCI format 2_0. The number of slots is equal to or larger than a PDCCH monitoring periodicity for DCI format 2_0. The SFI-index field includes $\log_2$ (maxSFIindex) bits where maxSFIindex is the maximum value of the values provided by corresponding higher layer parameters slotFormatCombinationId. A slot format is identified by a corresponding format index as provided in Table 11.1.1-1 where 'D' denotes a downlink symbol, 'U' denotes an uplink symbol, and 'F' denotes a flexible symbol.

If a PDCCH monitoring periodicity for DCI format 2_0, provided to a UE for the search space set s by higher layer parameter monitoringSlotPeriodicityAndOffset, is smaller than a duration of a slot format combination the UE obtains at a PDCCH monitoring occasion for DCI format 2_0 by a corresponding SFI-index field value, and the UE detects more than one DCI formats 2_0 indicating a slot format for a slot, the UE expects each of the more than one DCI formats 2_0 to indicate a same format for the slot.

[Table 11.1.1-1 of 3GPP TS 38.213 V15.2.0, entitled "Slot formats for normal cyclic prefix", is reproduced as FIGS. 5A and 5B]

For unpaired spectrum operation for a UE on a serving cell, the UE is provided by higher layer parameter subcarrierSpacing a reference subcarrier spacing configuration of $\mu_{SFI}$ for each slot format in a combination of slot formats indicated by a SFI-index field value in DCI format 2_0. The UE expects that for a reference subcarrier spacing configuration of $\mu_{SFI}$ and for an active DL BWP and UL BWP pair with subcarrier spacing configuration of u, it is $\mu \geq \mu_{SFI}$. Each slot format in the combination of slot formats indicated by the SFI-index field value in DCI format 2_0 is applicable to $2^{(\mu-\mu_{SFI})}$ consecutive slots in the active DL BWP and UL BWP pair where the first slot starts at a same time as a first slot for the reference subcarrier spacing configuration of $\mu_{SFI}$ and each downlink or flexible or uplink symbol for the reference subcarrier spacing configuration of $\mu_{SFI}$ corresponds to $2^{(\mu-\mu_{SFI})}$ consecutive downlink or flexible or uplink symbols for the subcarrier spacing configuration u.

A reference subcarrier spacing configurations of $\mu_{SFI}$, or $\mu_{SFI,DL}$, or $\mu_{SFI,SUL}$ is either 0, or 1, or 2 for frequency range 1 and is either 2 or 3 for frequency range 2.

For a set of symbols of a slot, a UE does not expect to detect a DCI format 2_0 with an SFI-index field value indicating the set of symbols of the slot as uplink and to detect a DCI format 1_0, a DCI format 1_1, or DCI format 0_1 indicating to the UE to receive PDSCH or CSI-RS in the set of symbols of the slot.

For a set of symbols of a slot, a UE does not expect to detect a DCI format 2_0 with an SFI-index field value indicating the set of symbols in the slot as downlink and to detect a DCI format 0_0, DCI format 0_1, DCI format 1_0, DCI format 1_1, or DCI format 2_3 indicating to the UE to transmit PUSCH, PUCCH, PRACH, or SRS in the set of symbols of the slot.

For a set of symbols of a slot that are indicated as downlink/uplink by higher layer parameters tdd-UL-DL-Configuration Common, tdd-UL-DL-ConfigurationCommon2, or tdd-UL-DL-ConfigDedicated, when provided to a UE, the UE does not expect to detect a DCI format 2_0 with an SFI-index field value indicating the set of For a set of symbols of a slot indicated to a UE as flexible by higher layer parameters tdd-UL-DL-Configuration Common, tdd-UL-DL-ConfigurationCommon2, and tdd-UL-DL-ConfigDedicated, when provided to the UE, or when higher layer parameters tdd-UL-DL-ConfigurationCommon, tdd-UL-DL-ConfigurationCommon2, and tdd-UL-DL-ConfigDedicated are not provided to the UE, and if the UE detects a DCI format 2_0 providing a format for the slot using a slot format value other than 255

If one or more symbols from the set of symbols are symbols in a control resource set configured to the UE for PDCCH monitoring, the UE receives PDCCH in the control resource set only if an SFI-index field value in DCI format 2_0 indicates that the one or more symbols are downlink symbols.

If an SFI-index field value in DCI format 2_0 indicates the set of symbols of the slot as flexible and the UE detects a DCI format 1_0, DCI format 1_1, or DCI format 0_1 indicating to the UE to receive PDSCH or CSI-RS in the set of symbols of the slot, the UE receives PDSCH or CSI-RS in the set of symbols of the slot.

If an SFI-index field value in DCI format 2_0 indicates the set of symbols of the slot as flexible and the UE detects a DCI format 0_0, DCI format 0_1, DCI format 1_0, DCI format 1_1, or DCI format 2_3 indicating to the UE to transmit PUSCH, PUCCH, PRACH, or SRS in the set of symbols of the slot the UE transmits the PUSCH, PUCCH, PRACH, or SRS in the set of symbols of the slot.

If an SFI-index field value in DCI format 2_0 indicates the set of symbols of the slot as flexible, and the UE does not detect a DCI format 1_0, DCI format 1_1, or DCI format 0_1 indicating to the UE to receive PDSCH or CSI-RS, or the UE does not detect a DCI format 0_0, DCI format 0_1, DCI format 1_0, DCI format 1_1, or DCI format 2_3 indicating to the UE to transmit PUSCH, PUCCH, PRACH, or SRS in the set of symbols of the slot, the UE does not transmit or receive in the set of symbols of the slot.

If the UE is configured by higher layers to receive PDSCH or CSI-RS in the set of symbols of the slot, the UE receives the PDSCH or the CSI-RS in the set of symbols of the slot only if an SFI-index field value in DCI format 2_0 indicates the set of symbols of the slot as downlink.

If the UE is configured by higher layers to transmit PUCCH, or PUSCH, or PRACH in the set of symbols of the slot, the UE transmits the PUCCH, or the PUSCH, or the PRACH in the slot only if an SFI-index field value in DCI format 2_0 indicates the set of symbols of the slot as uplink.

If the UE is configured by higher layers to transmit periodic SRS in the set of symbols of the slot, the UE transmits the periodic SRS only in a subset of symbols from the set of symbols of the slot indicated as uplink symbols by an SFI-index field value in DCI format 2_0.

A UE does not expect to detect an SFI-index field value in DCI format 2_0 indicating the set of symbols of the slot as downlink and also detect a DCI format 0_0, DCI format 0_1, DCI format 1_0, DCI format 1_1, or DCI format 2_3 indicating to the UE to transmit SRS, PUSCH, PUCCH, or PRACH, in one or more symbols from the set of symbols of the slot.

A UE does not expect to detect an SFI-index field value in DCI format 2_0 indicating the set of symbols of the slot as downlink if the set of symbols of the slot includes symbols corresponding to a first repetition of a PUSCH transmission activated by an UL Type 2 grant PDCCH as described in Subclause 10.2.

A UE does not expect to detect an SFI-index field value in DCI format 2_0 indicating the set of symbols of the slot as uplink and also detect a DCI format 1_0 or DCI format 1_1 or DCI format 0_1 indicating to the UE to receive PDSCH or CSI-RS in one or more symbols from the set of symbols of the slot.

If a UE is configured by higher layers to receive a CSI-RS or a PDSCH in a set of symbols of a slot and the UE detects a DCI format 20 with a slot format value other than 255 that indicates a slot format with a subset of symbols from the set of symbols as uplink or flexible, or the UE detects a DCI format 0_0, DCI format 0_1, DCI format 1_0, DCI format 1_1, or DCI format 2_3 indicating to the UE to transmit PUSCH, PUCCH, SRS, or PRACH in at least one symbol in the set of the symbols, the UE cancels the CSI-RS reception in the set of symbols of the slot or cancels the PDSCH reception in the slot.

A UE assumes that flexible symbols in a control resource set configured to the UE for PDCCH monitoring are downlink symbols if the UE does not detect an SFI-index field value in DCI format 2_0 indicating the set of symbols of the slot as flexible or uplink and the UE does not detect a DCI format 0_0, DCI format 0_1, DCI format 1_0, DCI format 1_1, or DCI format 2_3 indicating to the UE to transmit SRS, PUSCH, PUCCH, or PRACH in the set of symbols.

For a set of symbols of a slot that are indicated as flexible by higher layer parameters tdd-UL-DL-Configuration Common, tdd-UL-DL-ConfigurationCommon2, and tdd-UL-DL-ConfigDedicated, when provided to a UE, or when higher layer parameters tdd-UL-DL-ConfigurationCommon, or tdd-UL-DL-ConfigurationCommon2, and tdd-UL-DL-ConfigDedicated are not provided to the UE, and if the UE does not detect a DCI format 2_0 providing a slot format for the slot.

The UE receives PDSCH or CSI-RS in the set of symbols of the slot if the UE receives a corresponding indication by a DCI format 1_0, DCI format 1_1, or DCI format 0_1.

The UE transmits PUSCH, PUCCH, PRACH, or SRS in the set of symbols of the slot if the UE receives a corresponding indication by a DCI format 0_0, DCI format 0_1, DCI format 1_0, DCI format 1_1, or DCI format 2_3.

The UE receives PDCCH as described in Subclause 11.1.

If the UE is configured by higher layers to receive PDSCH or CSI-RS in the set of symbols of the slot, the UE does not receive the PDSCH or the CSI-RS in the set of symbols of the slot.

If the UE is configured by higher layers to transmit periodic SRS, or PUCCH, or PUSCH, or PRACH in the set of symbols of the slot, the UE does not transmit the PUCCH, or the PUSCH, or the PRACH in the slot and does not transmit the SRS in symbols from the set of symbols in the slot, if any, starting from a symbol that is a number of symbols equal to the PUSCH preparation time $N_2$ for the corresponding PUSCH timing capability after a last symbol of a control resource set where the UE is configured to monitor PDCCH for DCI format 2_0;

is not expected to cancel the transmission of the periodic SRS, or the PUCCH, or the PUSCH, or the PRACH in symbols from the set of symbols in the slot, if any, starting before a symbol that is a number of symbols equal to the PUSCH preparation time $N_2$ for the corresponding PUSCH timing capability after a last symbol of a control resource set where the UE is configured to monitor PDCCH for DCI format 2_0.

The Final Report of 3GPP TSG RAN WG1 #AH_1801 v1.0.0 includes the following agreements:

Agreements:

Explicitly add reference SCS field in UE-specific SFI table configuration

The UE does not expect the reference SCS to have larger SCS than any of the configured BWP the GC-PDCCH is configured for The reference SCS is UE-specifically configured per cell (new RRC parameter)

For FR1: 15 kHz/30 kHz/60 kHz

For FR2: 60 kHz/120 kHz

Agreement:

UE-specific SFI table configuration (including reference SCS(s)) is per cell

The Final Report of 3GPP TSG RAN WG1 #92 v1.0.0 includes the following agreements related to frame structure and/or SFI (Slot Format Indication):

Agreement:

For the CSS which a DCI format 2_0 is configured to be monitored on, the UE will only monitor the first one or two (from SFI configuration) PDCCH candidates of the configured aggregation level for DCI format 2_0

Agreement:

If a configured DCI format 2_0 is not received, PDCCH monitoring is performed till the next configured DCI format 2_0 monitoring occasion Agreement:

Restrict the combined periodicity for cell-specific DL/UL assignment to such that 20 ms is a multiple of the combined periodicity Agreement:

When the cell-specific DL/UL configuration is configured, no explicit offset is provided for the starting slot of the configured period, but the first slot of each even radio frame should be a starting slot of the configured cell-specific DL/UL pattern Agreement:

If a configured DCI format 2_0 is not received, before the next configured DCI format 2_0 monitoring occasion, UE will cancel RRC configured transmission, and assume RRC configured DL transmission is not transmitted, during semi-static configured flexible symbols Agreement:

Study the additional functionality needed beyond the specifications for operation in licensed spectrum in the following deployment scenarios.

Carrier aggregation between licensed band NR (PCell) and NR-U (SCell)

NR-U SCell may have both DL and UL, or DL-only.

Dual connectivity between licensed band LTE (PCell) and NR-U (PSCell)

Stand-alone NR-U

An NR cell with DL in unlicensed band and UL in licensed band

Dual connectivity between licensed band NR (PCell) and NR-U (PSCell)

The Final Report of 3GPP TSG RAN WG1 #92bis v1.0.0 includes the following agreements related to frame structure and/or SFI (Slot Format Indication):

Agreements:

UE does not expect the reference SCS in TDD UL/DL configuration common and common2 to be different UE does not expect the reference SCS in cell-specific UL/DL configuration in a cell to be larger than the SCS of any BWP configured for the cell Agreement:

Limit the size of the UE-specific SFI table to a max total of 512 values across all entries in Rel 15.

Agreement:

UE is not expected to monitor GC-PDCCH for SFI for a first cell in another cell with larger SCS than the first cell in Rel-15.

Agreement

In the slot format table in TS38.211, the entry 255 is defined such that when a slot format for a slot is indicated as 255, the UE does not use this information in deciding the cancellation of UE-specific RRC configured DL receptions or UE-specific RRC configured UL transmissions Agreements:

For a grant based PDSCH, rate matching around RRC configured CSI-RS, if the CSI-RS is cancelled by setting SFI to "flexible" or the UE does not detect the SFI for the slot, the PDSCH still rate match around the CSI-RS RE locations.

This may not have spec impact

The Draft Report of 3GPP TSG RAN WG1 #93 v0.2.0 includes the following agreements related to frame structure and/or SFI (Slot Format Indication):

Agreements:
When a configured SFI monitoring is cancelled under the condition that the symbols are indicated to be UL or flexible by an earlier SFI
 (Follow earlier agreement on configure DCI format 2_0 not detected) For the slots till the next configured DCI format 2_0 monitoring occasion with slot format not provided by earlier SFI, PDCCH monitoring is performed but the UE will cancel RRC configured transmission, and assume RRC configured DL transmission is not transmitted, during semi-static configured flexible symbols
 Spec change may not be needed
If GC-PDCCH monitoring is skipped due to DRX (treat this the same as if the configured GC-PDCCH monitoring is not detected)
 (Follow earlier agreement on configure DCI format 2_0 not detected) For the slots in the DRX ON cycle before the next configured DCI format 2_0 monitoring occasion, PDCCH monitoring is performed but the UE will cancel RRC configured transmission, and assume RRC configured DL transmission is not transmitted, during semi-static configured flexible symbols
 Spec change may not be needed
Agreement:
When configure the UE-specific SFI table, each entry at least explicitly specifies the slot formats for the slots equals to the configured SFI monitoring periodicity.
Agreement:
For Rel.15, on semi-static flexible symbol in a TDD cell, UE does not expect simultaneous RRC configurated DL reception and RRC configured UL transmission in the same symbol.
Conclusion:
For the previous agreement "For a slot covered by multiple SFIs transmitted at different slots, the UE does not expect to receive different slot format indicated by different SFIs", this include the case 255 is used for the slot format as well.
Agreement:
For the previous agreement on "RRC configured DL reception and RRC configured UL transmission cancellation based on miss-detection of configured DCI format 2_0 monitoring" only applies for slots when their slot formats are not indicated by any other detected DCI format 2_0.

R1-1806105 provides the following description:

3. Frame Structure 3.1 COT Structure

In a licensed band (esp. latency critical) scenario, the deployment of frequent DL-UL and UL-DL switching points is well motivated. On the other hand, when operating in unlicensed band scenario, because of the regulations, it may sometimes make sense to operate with less frequent switching points to match the regulatory requirements w.r.t. Maximum Channel Occupancy Time (MCOT) at the cost of latency, of course.

It was agreed in RAN1 #92bis to "study supporting more than one switching points within a TxOP". FIG. 1 shows an example with TxOP with one and two switching points. Support for multiple switching points can provide e.g. improved latency performance without increasing the overhead of frequent (Type 1) channel access procedures too much. From HARQ/scheduling point of view, it is not a problem to support TxOP with multiple switching points: Similar functionality is supported already for NR licensed band operation.

Multiple switching points within a TxOP needs to be taken into account in the channel access procedures. The length of the switching gap between different link directions needs to be considered as well. One example of multiple switching points within a TxOP is shown in FIG. 1:
 gNB performs Type 1 LBT at the beginning of TxOP (similarly as in LTE LAA)
 UEs perform Type 2 LBT at the beginning of the first UL portion (similarly as in LTE LAA)
 In the case of two switching points, gNB/UE perform Type 2 LBT or no LBT before the $2^{nd}$ transmission.
Observation 1: Introduction of multiple-switching points within COT does not necessarily increase the frequency of TYPE 2 LBT, while significantly reduces the latency.

Figure 6:
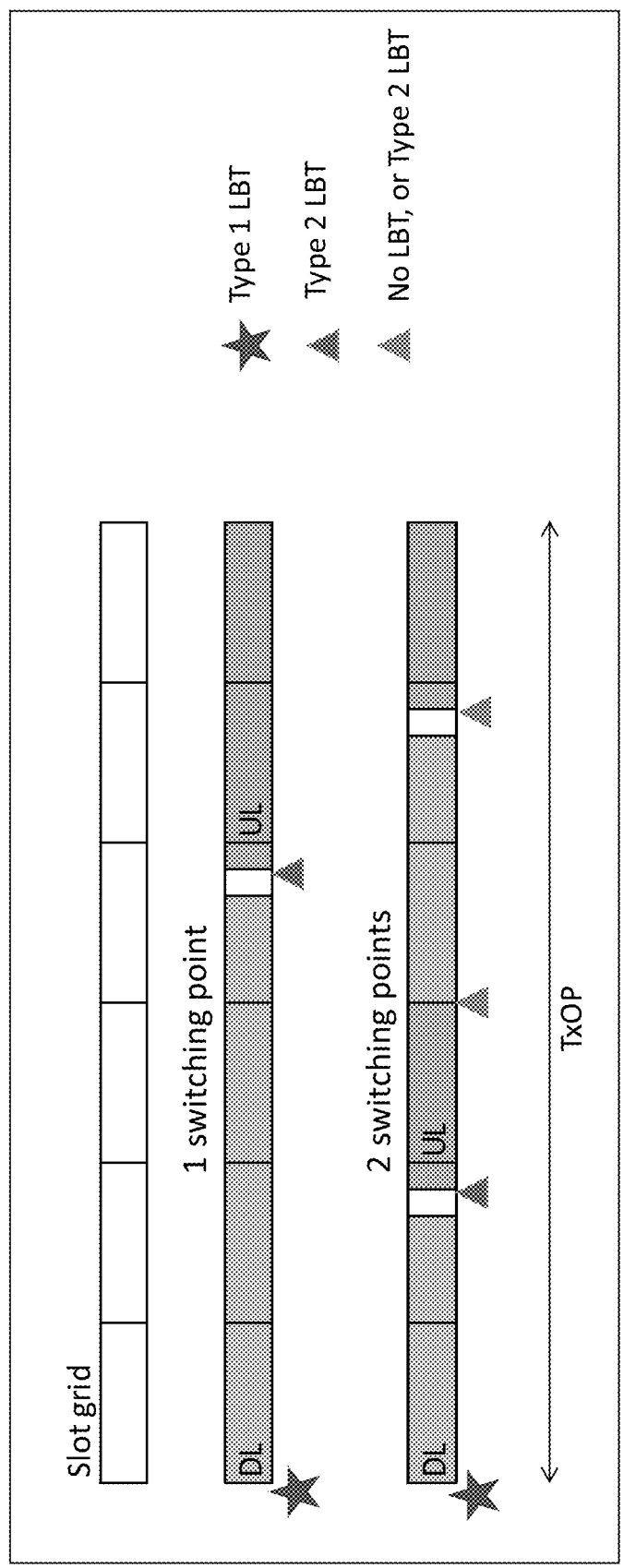
FIG. 6 is a reproduction of FIG. 1 of 3GPP R1-1806105.

[FIG. 1 of 3GPP R1-1806105, entitled "TxOP with 1 and 2 switching points", is reproduced as FIG. 6]

NR operation should support wide range of UL/DL ratios, including ones where there are several consecutive DL or UL slots. Hence, there is a need for fully flexible operation in terms of DL/UL switching, which can be achieved by means of the three basic slot types: bi-directional slot, DL-only slot and UL-only slot. It was agreed in RAN1 #92bis that "NR-U supports both Type-A and Type-B mapping". Type-B mapping (a.k.a. non-slot based scheduling with DMRS in the first symbols of PxSCH) allows flexible starting position in a slot and can reduce the time between the possible consecutive transmission starting positions. Type-A mapping, unlike TYPE-B, supports more flexible PDSCH/PUSCH time-domain resource allocations. Hence it can provide flexible ending symbol for the TxOP.

Generally speaking, NR frame structure defined for licensed spectrum scenarios provides a very good baseline from NR-U point of view, and only minor changes to the slot formats compared to licensed band operation are foreseen. For example, NR-U should introduce a possibility to have short PUCCH at the beginning of UL portion of the COT in the case of UL-only or bi-directional UL slots.

Proposal 6: NR Unlicensed band operation can be based on fixed frame timing and slot formats defined in NR Rel-15.

Proposal 7: NR-U operation should support short PUCCH located at the beginning of the UL portion of the COT.

Proposal 8: Study LBT options for the case with multiple switching points within a TxOP.

3.2 Mini-Slot Based Operation

When NR is applied on unlicensed bands requiring contention based channel access procedure, it is beneficial that gNB or UE can swiftly occupy channel once the channel access procedure indicates the channel to be vacant. If gNB or UE waits for too long in self-deferral to align transmissions with slot boundary, more agile systems may occupy the channel in the meanwhile.

It was agreed in RAN1 #92bis that "NR-U supports both Type-A and Type-B mapping, and "Additional starting positions and durations are not precluded". Mini-slots represent an efficient way to reduce the time between the possible consecutive transmission starting positions. However, more frequent transmission starting positions increase DL control channel blind decoding burden on the UE side and a reasonable trade-off between the DL control channel decoding burden and frequency of transmission starting positions is needed. FIG. 2 illustrates one example:
  UE is configured with PDCCH monitoring periodicity of 2 OFDM symbols
  The first mini-slots are used for aligning the ending position of the first transmission(s) with the slot boundary
  After the first mini-slots the UE continues PDCCH monitoring using periodicity of one slot.
This approach has several benefits:
  UE power saving: unnecessary PDCCH monitoring with a high periodicity (such as 2 OFDM symbols) can be avoided within the COT
  Reduced control channel and DMRS overhead (unnecessary mini-slot based PDCCH, HARQ-ACK and DMRS overhead is avoided) without compromising fast channel access.
  This approach can facilitate also smooth implementation as gNB can prepare DL transmission in advance w/o knowing the absolute starting timing of the starting time.
Proposal 9: Consider PDCCH monitoring, where non-slot based monitoring is used at the beginning of the COT and slot-based monitoring is used after first mini-slot(s) of the COT

Figure 7:
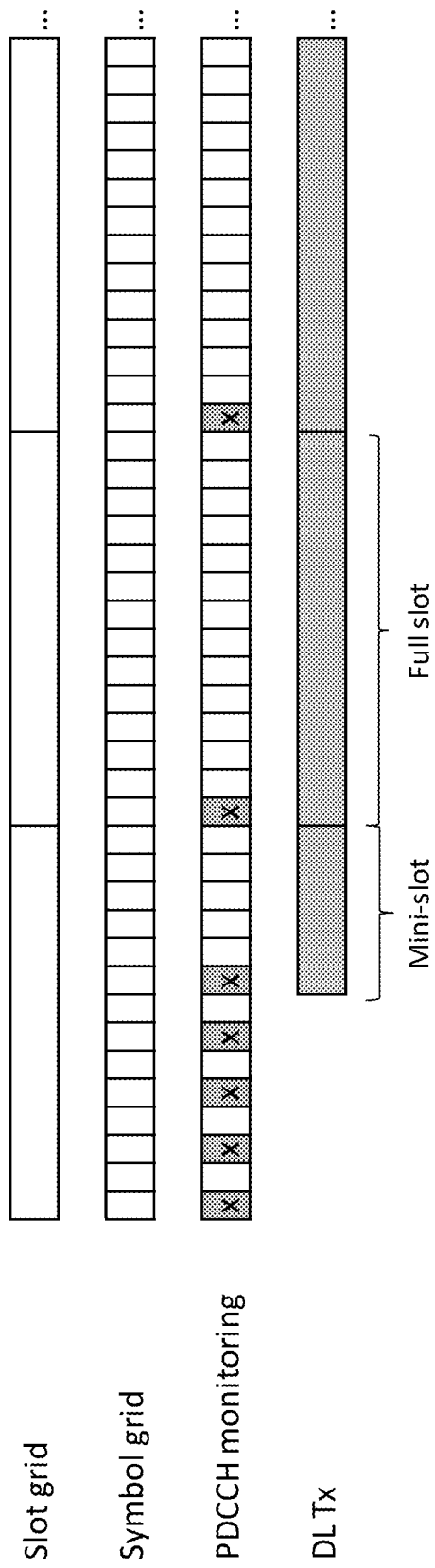
FIG. 7 is a reproduction of FIG. 2 of 3GPP R1-1806105.

[FIG. 2 of 3GPP R1-1806105, entitled "PDCCH monitoring", is reproduced as FIG. 7]

When gNB is contending for channel access on unlicensed band, gNB needs to have a mini-slot or a slot ready for transmission, but it does not know when it can access channel and transmit the prepared mini-slot/slot. If mini-slot structure (including PDCCH) depends on the time, e.g. in terms of scrambling or pilot positions/sequence, gNB needs to repeatedly re-build mini-slots with the same data while it is contending for channel access. A simpler implementation is achieved if gNB can build a mini-slot only once and then wait for channel access. This is possible if mini-slot structure/signal does not depend on time. Of course, this presents challenges for multiplexing of periodic signals to mini-slots, which requires further studies. Also, uncompromised inter-cell interference randomization via scrambling may be needed in some scenarios, implying that the time dependency/independency of mini-slot structure could be a configurable option or would only be applied for the mini-slots at the beginning of the COT.

Proposal 10: Possibilities for (mini-)slot structure independent from time are investigated.

Detecting the DL Transmission:

In LTE, there are CRS (cell-specific reference signals) present in each DL subframe and they can be used also for detecting the DL transmission in different LTE LAA scenarios. The CRS based approach cannot be used for NR-U simply because there are no CRS in the NR.

There are different options for detecting the DL transmission in NR-U:
  PDCCH monitoring: it can be assumed that monitoring on the full search space/number BDs is not possible at least in the cases when there are multiple starting positions/slot defined.
  PDCCH DMRS-based detection. This requires that PDCCH DMRS is transmitted via the entire CORESET at least in the beginning of the DL transmission.
  Detection of preamble at the beginning of DL transmission. Preamble can be constructed e.g. from CSI-RS/TRS and/or PSS/SSS.
We think that these options should be studied as part of the NR-U study item.

Proposal 11: Study different options to detect DL transmission in NR-U 3.3 Indicating the COT Structure NR licensed band operation supports both semi-static and dynamic configuration for SFI. We think that these options need to be supported also for NR-U:
  Semi-statically configured resources can be used e.g. for discovery reference signal and PRACH resources
  Dynamic indication of the time-varying COT structure is conveyed using GC-PDCCH.

Dynamic indication of the COT structure provides many benefits including the following:
  It enables usage of Type 2 LBT at the UE.
  GC-PDCCH can be used to determine the location of the short PUCCH at the beginning of UL portion of the COT.
  Provides opportunities for UE power saving (e.g. no PDCCH monitoring during UL portion of the COT)
  It can be used to aid CSI measurement at the UE.
  It can be used to detect (and/or validate) DL transmission detection.
  It makes sense to use GC-PDCCH for SFI defined in NR-Rel-15 as the starting point also for NR-U studies. However, NR-U specific aspects need to be considered as well. Those include e.g. NR-U-specific slot formats, wideband operation (based on 20 MHz sub-band), and support for multiple switching points within a COT.

Proposal 12: Use NR-U specific GC-PDCCH for dynamic indication of the COT structure.
  GC-PDCCH for SFI defined in NR-Rel-15 can be used as the starting point for discussion 3GPP TS 38.212 describes a DCI (Downlink Control Information) format for indicating slot format as follows:
  7.3.1 DCI Formats
  The DCI formats defined in table 7.3.1-1 are supported.
  [Table 7.3.1-1 of 3GPP TS 38.212 v15.2.0, entitled "DCI formats", is reproduced as FIG. 8]
  The fields defined in the DCI formats below are mapped to the information bits $a_0$ to $a_{A-1}$ as follows.
  Each field is mapped in the order in which it appears in the description, including the zero-padding bit(s), if any, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.
  If the number of information bits in a DCI format is less than 12 bits, zeros shall be appended to the DCI format until the payload size equals 12.
  7.3.1.3.1 Format 2_0
  DCI format 2_0 is used for notifying the slot format.
  The following information is transmitted by means of the DCI format 2_0 with CRC scrambled by SFI-RNTI:
    Slot format indicator 1, Slot format indicator 2, . . . , Slot format indicator N.
  The size of DCI format 2_0 is configurable by higher layers up to 128 bits, according to Subclause 11.1.1 of [5, TS 38.213].

3GPP TS 36.213 describes channel access procedures in LTE LAA/eLAA/FeLAA as follows:
  15 Channel Access Procedures for LAA
  15.1 Downlink Channel Access Procedures
  An eNB operating LAA Scell(s) shall perform the channel access procedures described in this sub clause for accessing the channel(s) on which the LAA Scell(s) transmission(s) are performed.

15.1.1 Channel Access Procedure for Transmission(s) Including PDSCH/PDCCH/EPDCCH The eNB may transmit a transmission including PDSCH/PDCCH/EPDCCH on a carrier on which LAA Scell(s) transmission(s) are performed, after first sensing the channel to be idle during the slot durations of a defer duration $T_d$; and after the counter N is zero in step 4. The counter N is adjusted by sensing the channel for additional slot duration(s) according to the steps below:

1) set $N=N_{init}$, where $N_{init}$ is a random number uniformly distributed between 0 and $CW_p$, and go to step 4;
2) if N>0 and the eNB chooses to decrement the counter, set N=N−1;
3) sense the channel for an additional slot duration, and if the additional slot duration is idle, go to step 4; else, go to step 5;
4) if N=0, stop; else, go to step 2.
5) sense the channel until either a busy slot is detected within an additional defer duration $T_d$ or all the slots of the additional defer duration $T_d$ are detected to be idle;
6) if the channel is sensed to be idle during all the slot durations of the additional defer duration $T_d$, go to step 4; else, go to step 5;

If an eNB has not transmitted a transmission including PDSCH/PDCCH/EPDCCH on a carrier on which LAA Scell(s) transmission(s) are performed after step 4 in the procedure above, the eNB may transmit a transmission including PDSCH/PDCCH/EPDCCH on the carrier, if the channel is sensed to be idle at least in a slot duration $T_{sl}$ when the eNB is ready to transmit PDSCH/PDCCH/EPDCCH and if the channel has been sensed to be idle during all the slot durations of a defer duration $T_d$ immediately before this transmission. If the channel has not been sensed to be idle in a slot duration $T_{sl}$ when the eNB first senses the channel after it is ready to transmit or if the channel has been sensed to be not idle during any of the slot durations of a defer duration $T_d$ immediately before this intended transmission, the eNB proceeds to step 1 after sensing the channel to be idle during the slot durations of a defer duration $T_d$.

The defer duration $T_d$ consists of duration $T_f=16$ us immediately followed by $m_p$ consecutive slot durations where each slot duration is $T_{sl}=9$ us, and $T_f$ includes an idle slot duration $T_{sl}$ at start of $T_f$;

A slot duration $T_{sl}$ is considered to be idle if the eNB senses the channel during the slot duration, and the power detected by the eNB for at least 4 us within the slot duration is less than energy detection threshold $X_{Thresh}$. Otherwise, the slot duration $T_{sl}$ is considered to be busy.

$CW_{min,p} \leq CW_p \leq CW_{max,p}$ is the contention window. $CW_p$ adjustment is described in sub clause 15.1.3.

$CW_{min,p}$ and $CW_{max,p}$ are chosen before step 1 of the procedure above.

$m_p$, $CW_{min,p}$, and $CW_{max,p}$ are based on channel access priority class associated with the eNB transmission, as shown in Table 15.1.1-1.

$X_{Thresh}$ adjustment is described in sub clause 15.1.4

If the eNB transmits discovery signal transmission(s) not including PDSCH/PDCCH/EPDCCH when N>0 in the procedure above, the eNB shall not decrement N during the slot duration(s) overlapping with discovery signal transmission.

The eNB shall not continuously transmit on a carrier on which the LAA Scell(s) transmission(s) are performed, for a period exceeding $T_{mcot,p}$ as given in Table 15.1.1-1.

For p=3 and p=4, if the absence of any other technology sharing the carrier can be guaranteed on a long term basis (e.g. by level of regulation), $T_{mcot,p}=10$ ms, otherwise, $T_{mcot,p}=8$ ms.

[Table 15.1.1-1 of 3GPP TS 36.213 v15.1.0, entitled "Channel Access Priority Class", is reproduced as FIG. 9]

For LAA operation in Japan, if the eNB has transmitted a transmission after N=0 in step 4 of the procedure above, the eNB may transmit the next continuous transmission, for duration of maximum T=4 msec, immediately after sensing the channel to be idle for at least a sensing interval of $T_{js}=34$ usec and if the total sensing and transmission time is not more than $1000 \cdot T_{mcot} + \lceil T_{mcot}/T_f - 1 \rceil \cdot T_{js}$ μsec. $T_{js}$ consists of duration $T_f=16$ us immediately followed by two slot durations $T_{sl}=9$ us each and $T_f$ includes an idle slot duration $T_{sl}$ at start of $T_f$. The channel is considered to be idle for $T_{js}$ if it is sensed to be idle during the during the slot durations of $T_{js}$.

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

Serving beam: A serving beam for a UE is a beam generated by a network node, e.g. TRP, which is currently used to communicate with the UE, e.g. for transmission and/or reception.

Candidate beam: A candidate beam for a UE is a candidate of a serving beam. Serving beam may or may not be candidate beam.

In LTE LAA/eLAA/FeLAA, before initiating a transmission, a wireless node shall perform a channel access procedure and/or LBT (Listen Before Talk) scheme successfully. As discussed in 3GPP TS 36.213, after a successful channel access procedure and/or LBT scheme, the wireless node is allowed to transmit for a period of time based on the traffic type with a maximum length limit called maximum channel occupancy time (MCOT). The time period in which the wireless node actually transmits could be a portion of the MCOT, and is called channel occupancy time (COT). Within the channel occupancy time, the wireless node, could perform transmission similar to licensed band.

In NR licensed band operation, network could indicate slot format or frame structure by semi-static signaling and/or dynamic signaling. Moreover, dynamic signaling could be a group common signaling and/or an unicast signaling. In 3GPP TS 38.213, a group common signaling could be downlink control information (DCI) format 2_0. For NR-U, it is good to inherit NR's signaling for indicating slot format. However, due to uncertainty of timing of a successful channel access procedure or LBT scheme performed by a UE or network, it is less beneficial to indicate slot format or frame structure by semi-static signaling. Instead, UE could be indicated slot format of unlicensed spectrum or cell based on dynamic signaling (e.g. downlink control information or group common DCI).

The study item of NR-based access to unlicensed spectrum (NR-U) was approved in RAN #75 meeting. The flexible design in NR, semi-static signaling, and/or dynamic signaling could indicate slot format in NR-U. Both semi-static signaling and/or dynamic signaling need to be configured in advance. Even though it is the dynamic signaling, gNB needs to configure periodic monitoring occasion for UE to receive the dynamic signaling. However, due to uncertainty of LBT, one or more than one monitoring occasion may occur outside COT of network node or base station (e.g. gNB). Based on the NR PHY standard (as discussed in 3GPP TS 38.213), the UE may apply procedure related to SFI miss (e.g. procedure or behavior in response to not detecting a SFI on configured occasions) if UE does not receive SFI. For a set of OFDM (Orthogonal Frequency Division Multiplexing) symbol indicated by semi-static signaling (i.e. RRC signaling) as "flexible" before next SFI monitoring occasion, the UE does not perform configured transmission or reception, perform periodic measurement except for performing control resource set (CORESET) monitoring on the set of OFDM symbol.

If the set of OFDM symbol is outside gNB's COT, it is quite reasonable for UE to only perform CORESET monitoring. However, if the set of OFDM symbol occurs in gNB's COT while SFI monitoring occasion is outside gNB's COT, it may be too conservative for UE to only perform CORESET monitoring. Since when gNB occupied the channel, gNB and UE may perform measurement for avoiding hidden node's problem. If periodic measurement is canceled due to SFI monitoring occasion outside gNB's COT, gNB may need to transmit a UE-specific DCI for triggering measurement. It may incur unnecessary signaling overhead. Possible solutions for the issue are described below.

One general concept is that UE could assume or determine slot format of slots during a set of OFDM symbols is determined based on RRC signaling(s). A set of OFDM symbols could be starting from beginning of the OFDM symbol where the UE detects a channel indicator and/or detects or be indicated a channel occupation until beginning of the first OFDM symbol of a SFI monitoring occasion. If UE is configured to perform transmission and/or reception within the set of OFDM symbols, the UE could perform the configured transmission and/or reception. The channel indicator could indicate (starting position of) a network's channel occupancy time (COT). In one embodiment, the SFI monitoring occasion could be a next or the nearest SFI monitoring occasion after the UE detects the channel indicator and/or detects or be indicated a channel occupation.

Another general concept is that a network could transmit a channel indicator to indicate or trigger UE to perform configured transmission and/or reception on a set of OFDM symbols, wherein the set of OFDM symbols are starting from the OFDM symbol where the network transmits the channel indicator and ending before a SFI monitoring occasion. In one embodiment, the SFI monitoring occasion could be a next or the nearest SFI monitoring occasion after the network's COT starts or after the network starts transmits a physical channel or RS receivable for served UE(s).

Another general concept is that a network transmits a slot format indication (SFI) for an unlicensed serving cell on starting slot or starting OFDM symbol of the network's COT in the unlicensed serving cell. In one embodiment, a slot format indication (SFI) could be a slot format indicator. In one embodiment, the SFI is transmitted on (or immediately after) a first allowable transmission boundary for transmitting a physical channel and/or RS within the network's COT in the unlicensed serving cell, wherein the transmitted physical channel and/or RS is receivable or decodable for served UE(s).

Another general concept is that slot format of slots outside a network's COT is assumed or considered by a UE as that each symbol in those slots is flexible. In one embodiment, slot format of slots inside the network's COT could be assumed or considered by the UE as that each symbol in those slots is flexible. Furthermore, slot format of slots inside the network's COT could be indicated by network, e.g. an SFI.

Any concepts discussed above can be formed or combined to form an embodiment. Some or all concepts discussed above can be combined to form an embodiment. In one embodiment, a set of OFDM symbols could comprise consecutive OFDM symbols. In one embodiment, a set of OFDM symbols could comprise consecutive OFDM symbols with one or more gap embedded in between.

Embodiment 1—A UE could be configured to transmit and/or receive in an unlicensed serving cell. The UE could be configured to perform transmission or reception on a (pre-)configured resource. In one embodiment, the UE could be configured to perform transmission or reception on a (pre-)configured resource (within a COT) (of network). More specifically, the UE could be configured to perform transmission or reception on a (pre-)configured resource (within a COT) in the unlicensed serving cell.

If the (pre-)configured resource is within a set of OFDM symbols, the UE could perform the transmission or reception on the (pre-)configured resource. In one embodiment, if the (pre-)configured resource is within a set of OFDM symbols and if a most recent SFI monitoring occasion before the set of OFDM symbols is outside the COT, or if the (pre-)configured resource is within a set of OFDM symbols and if a most recent SFI monitoring occasion before the set of OFDM symbols is located before the UE detects a channel indicator, the UE could perform the transmission or reception on the (pre-)configured resource even if the UE does not detect and/or receive an SFI (for the unlicensed serving cell) on the most recent SFI monitoring occasion.

In one embodiment, the set of OFDM symbols are starting from that UE detects a channel indicator and until (the first symbol of) a slot format indication (SFI) monitoring occasion, wherein the SFI monitoring occasion is the next or the nearest SFI monitoring occasion after the UE detects the channel indicator. If the (pre-)configured resource is within the set of OFDM symbols, whether the UE performs the transmission or reception on the (pre-)configured resource could be determined based on slot format or transmitted direction of the (pre-)configured resource indicated by RRC signaling(s). If transmitted direction of OFDM symbol of the (pre-)configured resource indicated by RRC signaling(s) is flexible and/or downlink, the UE could perform the configured reception on the (pre-)configured resource. Furthermore, if transmitted direction of OFDM symbol of the (pre-)configured resource indicated by RRC signaling(s) is flexible and/or uplink, the UE could perform the configured transmission on the (pre-)configured resource.

In one embodiment, if the UE is configured to perform transmission on the (pre-)configured resource, the UE could perform a channel access procedure or LBT scheme before the (pre-)configured resource. If a channel access procedure or LBT scheme before the (pre-)configured resource, performed by the UE, is successful, the UE could perform the configured transmission on the (pre-)configured resource. If channel access procedure/LBT scheme before the (pre-)configured resource, performed by the UE, is not successful, the UE may not perform the configured transmission on the (pre-)configured resource.

In one embodiment, a network could configure a UE to perform transmission or reception on a (pre-)configured resource. If the (pre-)configured resource is within a set of OFDM symbols, the network could perform reception or transmission on the (pre-)configured resource. The set of OFDM symbols could be starting from the OFDM symbol where the network transmits a channel indicator until a (next) SFI monitoring occasion, wherein the SFI monitoring occasion is a next or the nearest SFI monitoring occasion after the UE detects the channel indicator.

In one embodiment, if the (pre-)configured resource is within the set of OFDM symbols, whether the network performs transmission or reception on the (pre-)configured resource could be determined based on slot format, transmitted direction, or functionality of the (pre-)configured resource indicated by RRC signaling(s). If transmitted direction/functionality of OFDM symbol of the (pre-)configured resource indicated by RRC signaling(s) is flexible and/or downlink, the network could perform the configured transmission on the (pre-)configured resource. Furthermore, if transmitted direction/functionality of OFDM symbol of the (pre-)configured resource indicated by RRC signaling(s) is flexible and/or uplink, the network could perform the configured reception on the (pre-)configured resource.

In one embodiment, the RRC signaling(s) could be one or a combination of following parameter, tdd-UL-DL-ConfigurationCommon, tdd-UL-DL-ConfigurationCommon2, tdd-UL-DL-ConfigDedicated. The configured transmission could be configured grant transmission or grant free transmission, SRS transmission, report of configured downlink measurement, or uplink transmission. The configured reception could also be control resource set (CORESET) monitoring, downlink reference signal measurement, CSI-RS (Channel State Information-Reference Signal) measurement, SS-PBCH (Synchronization Signal-Physical Broadcast Channel) block measurement, or SPS-PDSCH (Semi Persistent Scheduling-Physical Downlink Shared Channel) reception.

Figure 10:
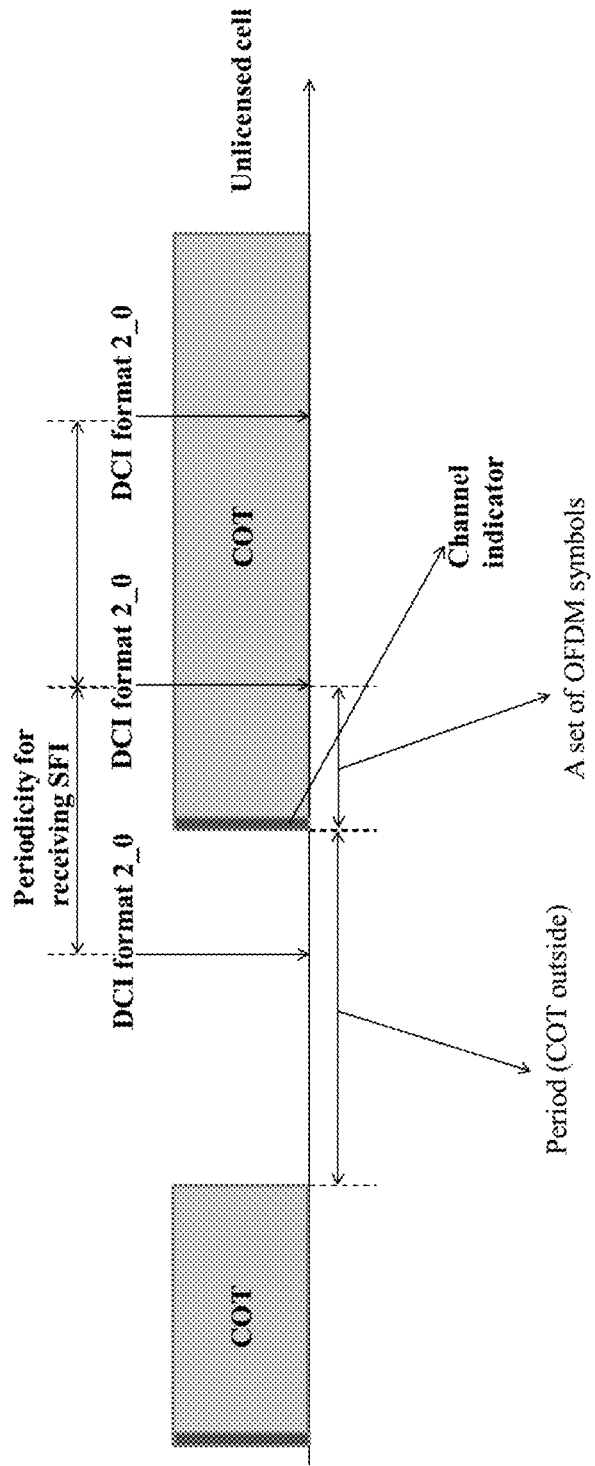
FIG. 10 is a diagram according to one exemplary embodiment.

In one embodiment, the UE could be configured to receive SFI periodically. The UE could also be configured for periodic SFI monitoring occasion. The UE may not receive and/or monitor a slot format indication (SFI) on a SFI monitoring occasion during a period or outside a COT from the network. The period may start from an ending symbol of one or last channel occupation and ending before the UE receives the channel indicator. An example of the period is illustrated in FIG. 10.

In one embodiment, if the UE does not receive a SFI on a SFI monitoring occasion after the UE detects the channel indicator, the UE may assume that the SFI is missed or the SFI is not detected, or the UE may not perform the configured transmission and/or the configured reception except for performing (periodical) CORESET monitoring. If the UE does not receive a SFI on a SFI monitoring occasion before the UE detects the channel indicator, wherein the SFI indicates slot format of the set of OFDM symbol(s), the UE could ignore the missed SFI.

In one embodiment, a SFI received in an SFI monitoring occasion at least could indicate slot format of slots beginning from the SFI monitoring occasion to next SFI monitoring occasion. A slot format indication (SFI) could be carried by or indicated in a downlink control information (DCI). The DCI could be DCI format 2_0. The SFI monitoring occasion(s) could be configured by indicating a periodicity and an offset. A SFI could indicate slot format(s) of one or more than one slot.

In one embodiment, the channel indicator could indicate a starting of a time duration. The time duration could be the network's channel occupancy time (COT). Within the time duration, the network could perform transmission without performing another one channel access procedure or another one channel access procedure with random access mechanism after the network performs a channel access procedure or LBT scheme (successfully).

In one embodiment, the channel indicator could be used for indicating a channel occupation or a channel occupation time. The UE may assume a network's COT starts from OFDM symbol where the UE receives the channel indicator. The UE may also assume an OFDM symbol where the UE receives the channel indicator is within network's COT. A network's COT could start earlier than the network transmits the channel indicator.

In one embodiment, the channel indicator could be a reference signal, or (one of) DMRS of CORESET, or a common signal, or a group common signal. The network could transmit the channel indicator if/after/once the network occupied the channel or performs channel access procedure or LBT schemes successfully. If/after the UE detects the channel indicator, the UE could be aware of starting of the network's COT. If/after the UE detects the channel indicator, the UE could ignore SFI miss when determining slot format, transmitted direction, or functionality of (slot(s) covering) the set of OFDM symbol(s), wherein the SFI miss occurs on an SFI monitoring occasion before the UE detects the channel indicator. If/after the UE detects the channel indicator, the UE could perform preconfigured transmission or reception on the set of OFDM symbol(s), even the SFI is not detected on an SFI monitoring occasion before the UE detects the channel indicator.

In one embodiment, the UE may perform transmission or reception on an unlicensed cell and/or a licensed cell. Furthermore, the network may perform transmission or reception on an unlicensed cell and/or a licensed cell.

In one embodiment, a channel occupation could mean that a wireless node perform transmission in unlicensed spectrum and/or unlicensed channel for a time period after a successful channel access procedure and/or LBT scheme. The time period could be a channel occupation time, where the wireless node can perform transmission (continuously). The time period could also be a channel occupation time, where the wireless node can perform transmission without performing another channel access procedure and/or LBT scheme. A channel occupation/a channel occupation time could be used to stand for a channel occupancy/a channel occupancy time.

In one embodiment, a UE detects a channel occupation (time) from or by the network could mean the UE detects or realizes that the network (currently) is allowed to perform transmission (continuously) for the time period (channel occupation time) after a successfully channel access procedure and/or LBT scheme.

Embodiment 2—A UE could be configured with periodic slot format indication (SFI) monitoring occasion(s) to receive slot format indication (SFI). Alternatively, a UE could be configured to receive slot format indication (SFI) in a periodic manner. If/after the UE detects or receives a channel indicator, the UE could receive a special SFI on an occasion, wherein the occasion is not the configured SFI monitoring occasion. The special SFI could be a SFI-related signal.

In one embodiment, in the same slot where the UE detects and/or receives a channel indicator, the UE may (expect to) receive a special SFI. If/after the UE detects and/or receives a channel indicator, the UE could receive a special SFI on an occasion. The special SFI may not be transmitted periodically or may be transmitted aperiodically. In one embodiment, the special SFI could be an event triggered transmission, e.g. transmitted when or after network performs a successful channel access procedure to transmit in unlicensed spectrum.

In one embodiment, a network could configure or indicate a UE periodic SFI monitoring occasion. If the network performs channel access procedure or LBT scheme successfully, the network may transmit a channel indicator. The channel indicator could be transmitted on beginning of the network's channel occupancy time (COT). The channel indicator could also be transmitted after the first allowable transmission boundary from the beginning of the network's COT. If/after the network transmits the channel indicator, the network could transmit a special SFI, which may be transmitted on a control resource set (CORESET). In one embodiment, the special SFI may be transmitted on an occasion. The occasion may occur after the network transmits the channel indicator. More specifically, the occasion may occur after the network transmits the channel indicator and before a next or the nearest SFI monitoring occasion, wherein the next or the nearest SFI monitoring occasion is located after the channel indicator.

If the network performs channel access procedure or LBT scheme successfully, the network may transmit a channel indicator and/or a special SFI on a control resource set (CORESET). Furthermore, if the network performs channel access procedure or LBT scheme successfully, the network transmits a special SFI on an occasion.

Figure 11:
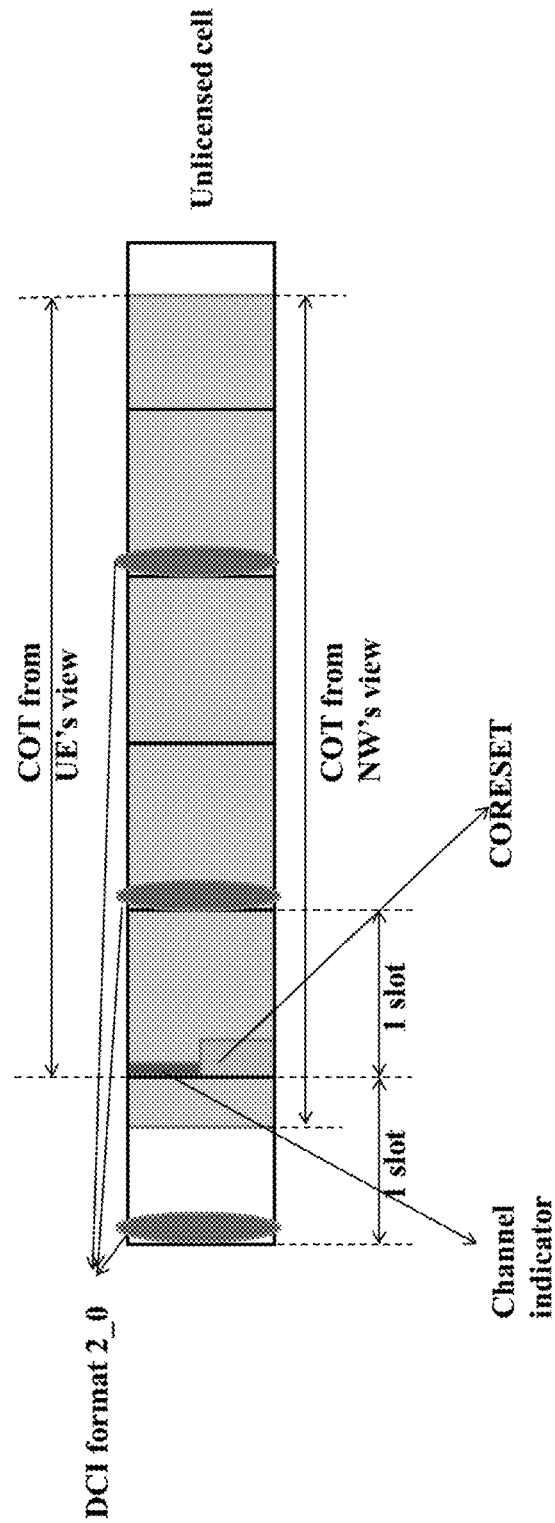
FIG. 11 is a diagram according to one exemplary embodiment.

In one embodiment, the occasion may not be the configured (periodical) SFI monitoring occasion. The occasion is not the configured (periodical) SFI monitoring occasion. The occasion could be a (starting position of) control resource set (CORESET) and/or a search space (monitoring occasion) after the UE receives the channel indicator, or after the network performs channel access procedure or LBT scheme successfully. Furthermore, the occasion could be the next or the nearest CORESET and/or search space (monitoring occasion), after the UE receives the channel indicator or after the network performs channel access procedure or LBT scheme successfully. The occasion could also be before the (periodical) SFI monitoring occasion(s), which occurs after the UE receives the channel indicator, or after the network transmits the channel indicator. For example, in FIG. 11, the specific SFI could be transmitted in the CORESET/monitoring occasion, which is not the (preconfigured) periodic SFI monitoring occasion.

In one embodiment, the occasion could occupy a time domain resources starting from the OFDM symbol, where the UE receives the channel indicator. The occasion could also occupy a time domain resources ending until the first OFDM symbol of a (periodical) SFI monitoring occasion (firstly) occurring after the OFDM symbol, where the UE receives the channel indicator. In addition, the occasion could occupy a time domain resources comprising consecutive OFDM symbols.

In one embodiment, the occasion could be on a first allowable transmission boundary for transmitting physical channel and/or RS within the network's COT in the unlicensed serving cell, wherein the transmitted physical channel and/or RS is receivable or decodable for served UE(s). The occasion could also be starting from a first allowable transmission boundary for transmitting physical channel and/or RS within the network's COT in the unlicensed serving cell, wherein the transmitted physical channel and/or RS is receivable or decodable for served UE(s).

In one embodiment, the (periodical) SFI monitoring occasion could be a next or the nearest configured SFI monitoring occasion after the UE receives the channel indicator. The CORESET and/or the search space could be the CORESET and/or the search space configured for receiving a/the SFI. Furthermore, the CORESET and/or the search space could be a next or the nearest CORESET and/or the search space after the UE receives the channel indicator. In one embodiment, the special SFI could indicate slot format at least from the OFDM symbol where the UE receives the channel indicator or the special SFI until next (available) SFI monitoring occasion.

In one embodiment, the UE could assume slot format(s) of slot(s) or transmitted direction/functionality of a set of OFDM symbols based on RRC signaling(s), wherein the set of OFDM symbols are starting from (a symbol) where the UE receives the channel indicator and until the first symbol of timing resources of the CORESET.

In one embodiment, the occasion could occur in the middle of a slot (i.e. not in the first 2 or 3 OFDM symbols of a slot), or in the beginning of a slot (e.g. starting from the first symbol of a slot). The CORESET and/or a search space associated with the CORESET or the occasion may not be transmitted and/or monitored in a licensed serving cell or licensed spectrum.

In one embodiment, if the UE does not receive the special SFI, the UE may consider that SFI miss or the special SFI is not detected on OFDM symbols starting from beginning of the occasion until next or the nearest SFI monitoring occasion, or the UE may not (be allowed to) perform configured transmission or reception except for (periodical) CORESET monitoring on a set of OFDM symbols starting from (the end of) the occasion until next or the nearest SFI monitoring occasion. The next or the nearest SFI monitoring occasion may occur inside the network's COT.

In one embodiment, the UE may not receive a slot format indication (SFI) on a SFI monitoring occasion during a period. The period could be starting from ending position of last COT and ending before the UE receives the channel indicator. An example of the period is in FIG. 10.

In one embodiment, if the UE does not receive a SFI on a (periodical) SFI monitoring occasion after the UE detects the channel indicator, the UE may assume that the SFI is missed or the SFI is not detected, or the UE may not perform the configured transmission and/or the configured reception except for performing (periodical) CORESET monitoring. Furthermore, if the UE does not receive a SFI on a (periodical) SFI monitoring occasion before the UE detects the channel indicator, wherein the SFI indicates slot format of the set of OFDM symbol(s), the UE could ignore the missed SFI.

In one embodiment, a SFI received in an (periodical) SFI monitoring occasion could at least indicate slot format of slots from the SFI monitoring occasion to next SFI monitoring occasion. A slot format indication (SFI) could be carried by or indicated in a downlink control information (DCI). (Periodical) SFI monitoring occasion(s) could be configured by indicating a periodicity and an offset. A SFI could indicate slot format(s) of one or more than one slot. The channel indicator could indicate (starting of) a network's channel occupancy time (COT).

Embodiment 3—If a UE is configured to receive or monitor slot format indication (SFI) in an unlicensed serving cell, whether the UE monitors or receives SFI could be determined based on a channel indicator. In one embodiment, the UE may not monitor or receive SFI before the UE receives or detects the channel indicator, and/or after the end of a channel occupation time from the network or the UE in the unlicensed serving cell and until the UE receives or detects the channel indicator.

Before the UE receives or detects the channel indicator, the UE may assume slot format, transmitted direction, functionality of slots, or OFDM symbols is flexible. Furthermore, after the end of a channel occupation time from the network or the UE in the unlicensed serving cell and until the UE receives or detects the channel indicator, the UE may assume slot format, transmitted direction, functionality of slots, or OFDM symbols is flexible. In one embodiment, the UE may assume slot format, transmitted direction, functionality of slots, or OFDM symbols is flexible, which is located after the end of a channel occupation time from the network or the UE in the unlicensed serving cell and until the UE receives or detects the channel indicator. Before the UE receives or detects the channel indicator, the UE could perform monitoring the channel indicator. After the end of a channel occupation time from the network or the UE in the unlicensed serving cell and until the UE receives or detects the channel indicator, the UE could perform monitoring and/or detecting the channel indicator.

In one embodiment, the UE may not consider that SFI is not detected before the UE receives or detects the channel indicator, and/or after the end of a channel occupation time from the network or the UE in the unlicensed serving cell and until the UE receives or detects the channel indicator. If/after the UE receives/detects the channel indicator, the UE could monitor or receive SFI on configured SFI monitoring occasion during a time duration (or a COT).

In one embodiment, the UE may not perform configured physical channel and/or RS reception (in a flexible symbol) outside a COT (except for monitoring for the channel indicator). Furthermore, the UE may not perform configured physical channel and/or RS transmission (in a flexible symbol) outside a COT.

In one embodiment, the UE may not perform configured physical channel and/or RS reception (in a flexible symbol which is) after the end of a channel occupation time from the network or the UE in the unlicensed serving cell and until the UE receives or detects the channel indicator (except for monitoring for the channel indicator). Furthermore, the UE may not perform configured physical channel and/or RS transmission (in a flexible symbol which is) after the end of a channel occupation time from the network or the UE in the unlicensed serving cell and until the UE receives or detects the channel indicator.

Figure 12:
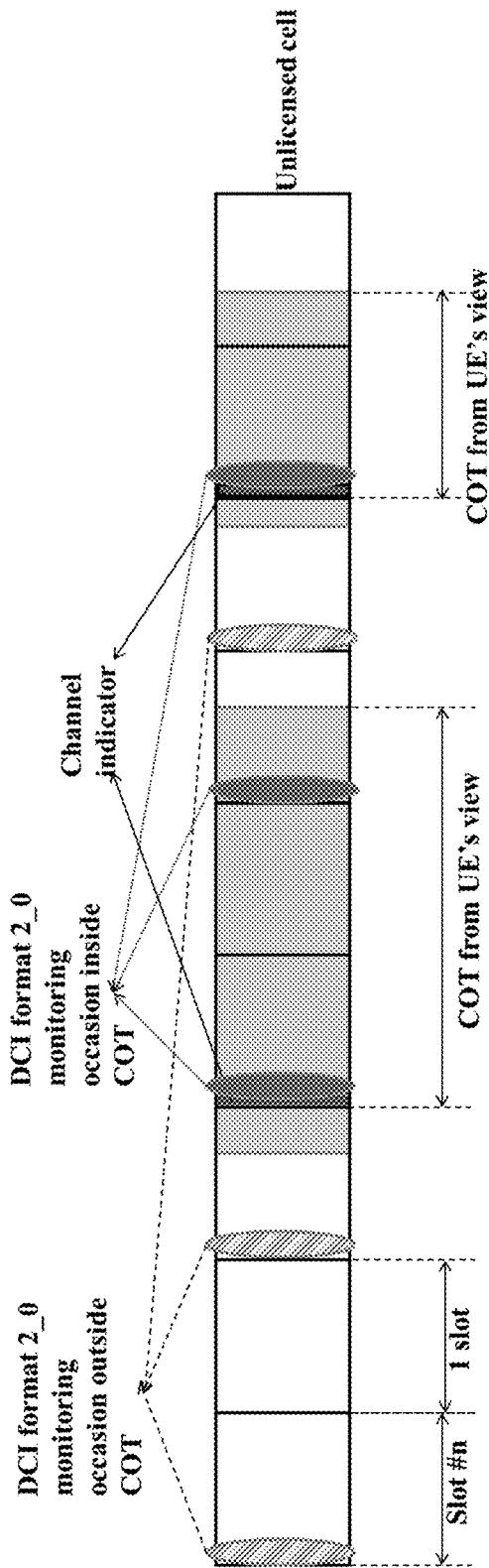
FIG. 12 is a diagram according to one exemplary embodiment.

For example, in FIG. 12, assuming a UE is configured to receive DCI format 2_0 (SFI) in an unlicensed cell every 2 slots and assuming slot offset is 0. In this example, before the UE receives and/or detects channel indicator in slot #n+3, one way is that the UE does not monitor SFI monitoring occasion in slot #n and in slot #n+2. Another way is that the UE could perform SFI monitoring in slot #n and slot #n+2. In FIG. 12, before the UE receives and/or detects channel indicator in slot #n+7, the UE monitors SFI monitoring occasion in slot #n+6. Alternatively, before the UE receives and/or detects channel indicator in slot #n+7, the UE does not monitor SFI monitoring occasion in slot #n+6.

In one embodiment, the UE could receive a configuration to monitor and/or receive slot format indication (SFI) in an unlicensed serving cell. The configuration may indicate at least one of the followings: a periodicity, a slot offset (the slot offset may not be configured to be larger than a COT), a quantity of consecutive monitoring occasions, a bit-map, or (periodic) monitoring occasions of SFI.

In one embodiment, if/after the UE receives the channel indicator, the slot offset could be applied relative to a slot, where the UE receives the channel indicator. Monitoring occasion for the signal based on the configuration could be applied relative to a slot, where the UE receives the channel indicator. If/after the UE receives the channel indicator in slot with slot index #n, a monitoring occasion with slot index #m for the signal within a time period shall satisfy that mod(m-n, the periodicity)=the slot offset (if the quantity of consecutive monitoring occasions is not configured).

In one embodiment, if/after the UE receives the channel indicator in slot with slot index #n, monitoring occasion(s) for the signal within a time period (shall) starts from or occurs in a slot with slot index #m satisfying that mod(m-n, the periodicity)=the slot offset and there are contiguous monitoring occasion(s) starting from slot #m (including the monitoring occasion in slot #m) as indicated by the quantity.

Figure 13:
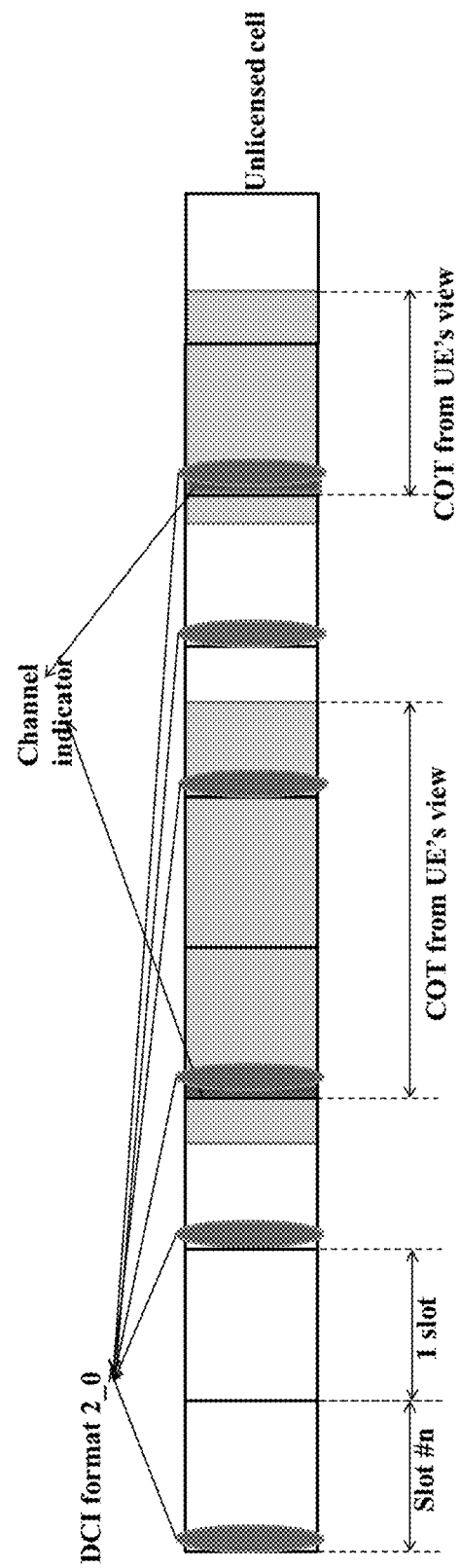
FIG. 13 is a diagram according to one exemplary embodiment.

For example, in FIG. 13, assuming configuration for DCI format 2_0 could indicate that periodicity is 2 slots and slot offset is 0 and a quantity of consecutive monitoring occasions (for a periodic opportunity) is not configured. In this example, if the UE receives the channel indicator in slot #n+3, the UE may assume slot #n+3 is a reference slot for applying the configuration for receiving DCI format 2_0 within a COT (slot #n+3 to slot #n+5). In other words, if the UE receives the channel indicator, a monitoring occasion of DCI format 2_0 (i.e. slot #m) within a time period (or COT from UE's view) (shall) satisfy that mod (slot #m-slot #n+3, 2)=0. In this example, the UE could have at least one monitoring occasion (i.e. in slot #n+3, and in slot #n+5) within a time period (or COT from UE's view) for receiving a DCI format 2_0. Similarly, in FIG. 13, if the UE receives the channel indicator in slot #n+7, the UE could have at least one monitoring occasion (i.e. in slot #n+7) within a time period (COT from UE's view) for receiving a DCI format 2_0.

In FIG. 13, for a monitoring occasion outside a time period, the UE could monitor or detect DCI format 2_0 based on the configuration for DCI format 2_0. For a monitoring occasion outside a time period, the configuration for DCI format 2_0 is applied referenced based on a slot. Preferably, the slot could be with a physical or logical slot index "0". In this example, assuming slot #n could be the (referenced) slot for outside a time period. Alternatively, the configuration for a monitoring occasion outside a time period (e.g., a second configuration or parameters) is another configuration, which is different from the configuration for a monitoring occasion inside a time period (e.g., a first configuration or parameters). When/after a UE detects or receives a channel indicator (e.g., inside a time period), the UE receives DCI format 2_0 in the time period based on the first configuration or parameters. In one embodiment, the configuration for a monitoring occasion outside a time period (e.g., the second configuration or parameters) may be referenced to the slot. The configuration for a monitoring occasion inside a time period (e.g., the first configuration or parameters) may be referenced to the slot (which is the same as the outside example). In one embodiment, the configuration for a monitoring occasion inside a time period may indicate a different periodicity and/or slot offset and/or enabled/configured a quantity of consecutive monitoring occasion(s) from the configuration for a monitoring occasion outside a time period. For example, the configuration for a monitoring occasion inside a time period may indicate a quantity of consecutive monitoring occasion(s) while the configuration for a monitoring occasion outside the time period does not indicate a quantity of consecutive monitoring occasion(s). In another embodiment, the configuration for a monitoring occasion inside a time period could be the same that periodicity is 2 slots and slot offset is 0 and a quantity of consecutive monitoring occasions is not configured. In other words, the UE could monitor DCI format 2_0 in slot #n, slot #n+2, slot #n+6. Another alternative is that the UE may not monitor/detect a DCI format 2_0 and/or monitoring occasion(s) outside the time period.

In one embodiment, before the UE receives the channel indicator, and/or after the end of a time period and until receiving the channel indicator, the UE may not monitor/detect DCI format 2_0. Furthermore, before the UE receives the channel indicator, the UE could monitor or detect DCI format 2_0 or the signal on a monitoring occasion with slot index #m satisfying that mod(m, the periodicity)=the slot offset (if the quantity of consecutive monitoring occasions is not configured). In one embodiment, slot index is physical slot index or logical slot index. In addition, after the end of a time period and until receiving the channel indicator, the UE could monitor/detect DCI format 2_0 or the signal on a monitoring occasion with slot index #m satisfying that mod(m, the periodicity)=the slot offset (if the quantity of consecutive monitoring occasions is not configured).

In one embodiment, before the UE receives the channel indicator, the UE could monitor or detect DCI format 2_0 or the signal on a monitoring occasion starting from or occurs in a slot with slot index #m satisfying that mod(m, the periodicity)=the slot offset and there are contiguous monitoring occasion(s) starting from slot #m (including the monitoring occasion in slot #m) as indicated by the quantity, if indicated. Furthermore, after the end of a time period and until receiving the channel indicator, the UE could monitor or detect DCI format 2_0 or the signal on a monitoring occasion starting from or occurs in a slot with slot index #m satisfying that mod(m, the periodicity)=the slot offset and there are contiguous monitoring occasion(s) starting from slot #m (including the monitoring occasion in slot #m) as indicated by the quantity, if indicated.

In one embodiment, if/after a network performs channel access procedure or LBT scheme successful, the network could transmit a channel indicator. Furthermore, if and/or after the network transmits the channel indicator or performs a channel access procedure successfully, the network may perform transmission and/or reception during a time duration. The time duration could be the network's channel occupancy time (COT). The time duration may be smaller than or located within the network's channel occupancy time (COT). The time duration could start from an OFDM symbol, where the UE detects the channel indicator.

In one embodiment, ending position of the time duration could be determined based on either an indication for the UE indicating ending position or a maximum value or a (actual) channel occupation time used for the network after a (successful) channel access procedure and/or LBT scheme. The maximum value could refer to maximum channel occupancy time of a (channel access or LBT) priority class of the network. The network could transmit the indication to a UE for indicating ending position of the time duration. The channel indicator could indicate (starting of) a network's channel occupancy time (COT).

Embodiment 4—A network could perform transmission or reception in an unlicensed (serving) cell. The network may not (be allowed to) configure or indicate slot format for slots or symbols in the unlicensed (serving) cell by RRC signaling(s). A UE could perform transmission or reception in an unlicensed (serving) cell. The UE may not expect to be configured with or be indicated slot format of slots or symbols by RRC signaling(s) for the unlicensed (serving) cell. In one embodiment, the network may not (be allowed to) indicate a UE that which functionality or state or transmission direction of a slot(s) or OFDM symbol(s) by RRC signaling. In one embodiment, the network may (be allowed to) indicate dynamic SFI indication related configuration to the UE. In one embodiment, the UE may not be indicated that which functionality or state or transmission direction of a slot or OFDM symbol by RRC signaling. In one embodiment, in response to not being indicated which functionality or state or transmission direction of a slot or symbol by RRC signaling, the UE may consider or assume that the slot or symbol is flexible unless further (dynamic) SFI indication.

All or some of above embodiments can be combined to form a new embodiment.

Figure 15:
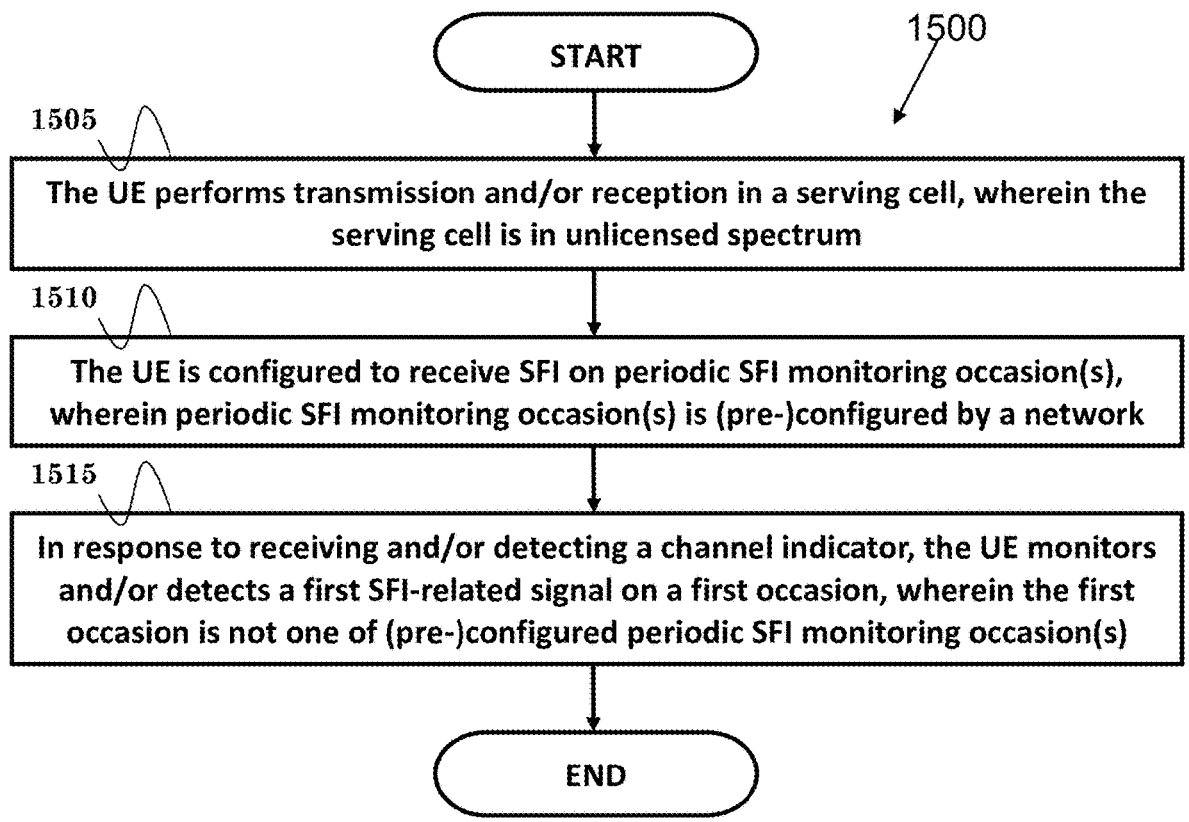
FIG. 15 is a flow chart according to one exemplary embodiment.

FIG. 15 is a flow chart 1500 according to one exemplary embodiment from the perspective of a UE (User Equipment). In step 1505, the UE performs transmission and/or reception in a serving cell, wherein the serving cell is in unlicensed spectrum. In step 1510, the UE is configured to receive SFI on periodic SFI monitoring occasion(s), wherein periodic SFI monitoring occasion(s) is (pre-)configured by a network. In step 1515, in response to receiving and/or detecting a channel indicator, the UE monitors and/or detects a first SFI-related signal on a first occasion, wherein the first occasion is not one of (pre-)configured periodic SFI monitoring occasion(s).

In one embodiment, in response to receiving and/or detecting a channel indicator, the UE could monitor and/or detect a first SFI-related signal on a first occasion, wherein the first occasion is not one of (pre-)configured SFI monitoring occasion(s). The first SFI-related signal could indicate slot format or functionality at least for symbol(s) starting from a OFDM symbol where the UE receives the first SFI-related signal until the start of next available SFI monitoring occasion. The UE could monitor and/or detect a second SFI-related signal on a second occasion, wherein the second occasion is among one of (pre-)configured SFI monitoring occasion(s). A SFI monitoring occasion could mean a starting position to monitor a SFI-related signal, or a time-frequency resource to monitor a SFI-related signal. The first occasion may occur on or start from a slot or OFDM symbol, where the UE receives the channel indicator. The first occasion could be (starting position of) the most recent CORESET (Control Resource Set) and/or search space monitoring occasion after the UE receives the channel indicator.

In one embodiment, the channel indicator could indicate or imply occurring of a network's channel occupancy time (COT). The channel indicator could be a DMRS (Demodulation Reference Signal) of CORESET or a common signal or a group common signal.

In one embodiment, in response to detecting the channel indicator, the UE may be allowed to perform preconfigured transmission or reception within a set of OFDM symbol(s) located after the channel indicator, regardless of whether or not the UE detects SFI on periodic SFI monitoring occasion(s) before the channel indicator.

Referring back to FIGS. 3 and 4, in one exemplary embodiment of a UE, the device 300 includes a program code 312 stored in the memory 310. The CPU 308 could execute program code 312 to enable the UE (i) to perform transmission and/or reception in a serving cell, wherein the serving cell is in unlicensed spectrum, (ii) to be configured to receive SFI on periodic SFI monitoring occasion(s), wherein periodic SFI monitoring occasion(s) is (pre-)configured by a network, and (iii) to, in response to receiving and/or detecting a channel indicator, monitor and/or detect a first SFI-related signal on a first occasion, wherein the first occasion is not one of (pre-)configured periodic SFI monitoring occasion(s). Furthermore, the CPU 308 can execute the program code 312 to perform all of the above-described actions and steps or others described herein.

Figure 16:
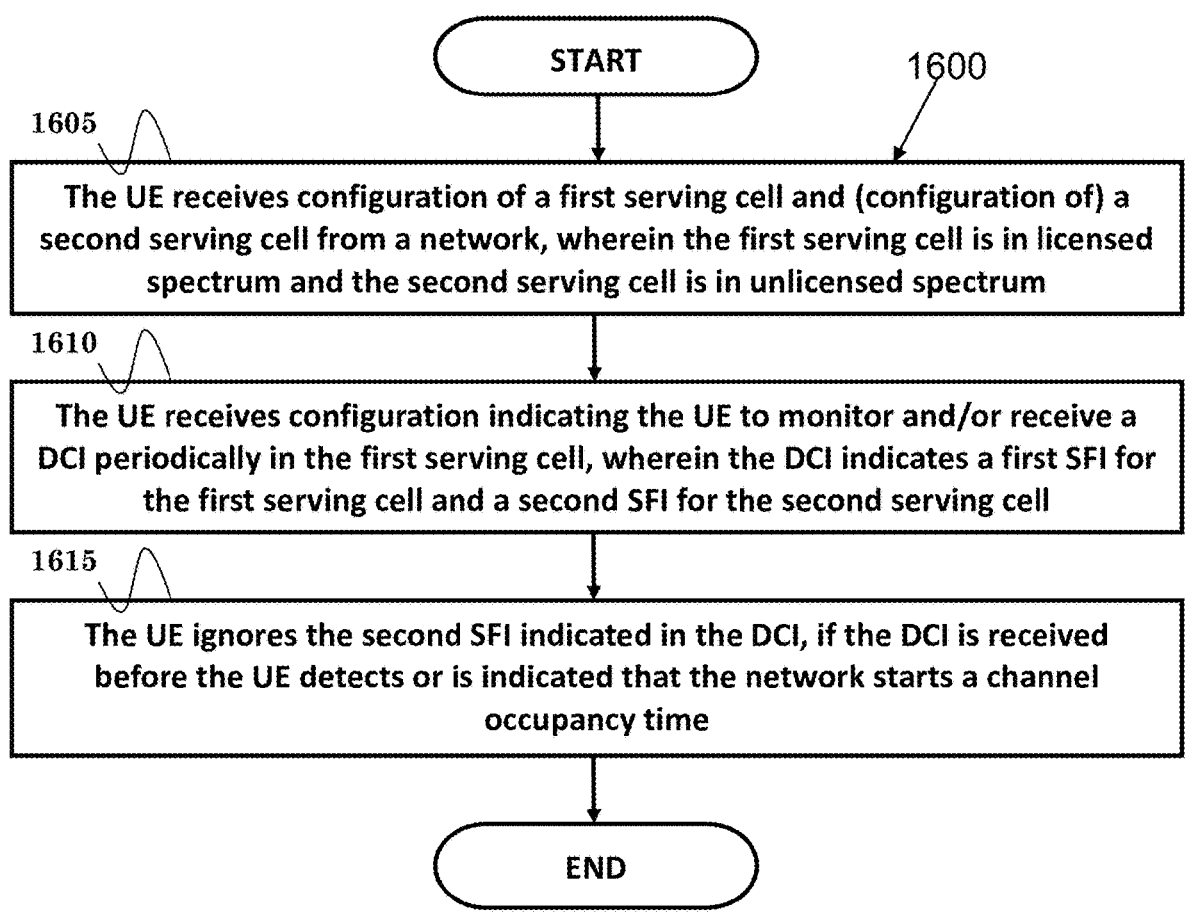
FIG. 16 is a flow chart according to one exemplary embodiment.

FIG. 16 is a flow chart 1600 according to one exemplary embodiment from the perspective of a UE. In step 1605, the UE receives configuration of a first serving cell and (configuration of) a second serving cell from a network, wherein the first serving cell is in licensed spectrum and the second serving cell is in unlicensed spectrum. In step 1610, the UE receives configuration indicating the UE to monitor and/or receive a DCI (Downlink Control Information) periodically in the first serving cell, wherein the DCI indicates a first SFI (Slot Format Indication) for the first serving cell and a second SFI for the second serving cell. In step 1615, the UE ignores the second SFI indicated in the DCI, if the DCI is received before the UE detects or is indicated that the network starts a channel occupancy time.

In one embodiment, the UE could discard the second SFI indicated in the DCI, if the DCI is received before the UE detects or is indicated that the network starts a channel occupancy time. Furthermore, the UE could ignore or discard the second SFI indicated in the DCI, if the DCI is received before the UE detects or is indicated that the network starts a channel occupancy time, and if the second SFI indicates slot format value, which is not a particular value. The particular value could indicate that the UE is allowed to perform preconfigured transmission or reception. In one example, the particular value may be 255 or the largest slot format value allowed to be indicated. In another example, the particular value may be a reserved value (e.g., 254).

In one embodiment, the UE could detect or be indicated that the network starts a channel occupancy time by receiving a channel indicator. The channel indicator could be a DMRS of a CORESET (Control Resource Set) or a common signal or a group common signal. Furthermore, the channel indicator could be transmitted by the network after or in response to the network occupying an unlicensed channel or performing a channel access procedure successfully.

Referring back to FIGS. 3 and 4, in one exemplary embodiment of a UE, the device 300 includes a program code 312 stored in the memory 310. The CPU 308 could execute program code 312 to enable the UE (i) to receive configuration of a first serving cell and (configuration of) a second serving cell from a network, wherein the first serving cell is in licensed spectrum and the second serving cell is in unlicensed spectrum, (ii) to receive configuration indicating the UE to monitor and/or receive a DCI periodically in the first serving cell, wherein the DCI indicates a first SFI for the first serving cell and a second SFI for the second serving cell, and (iii) to ignore the second SFI indicated in the DCI, if the DCI is received before the UE detects or is indicated that the network starts a channel occupancy time. Furthermore, the CPU 308 can execute the program code 312 to perform all of the above-described actions and steps or others described herein.

Figure 17:
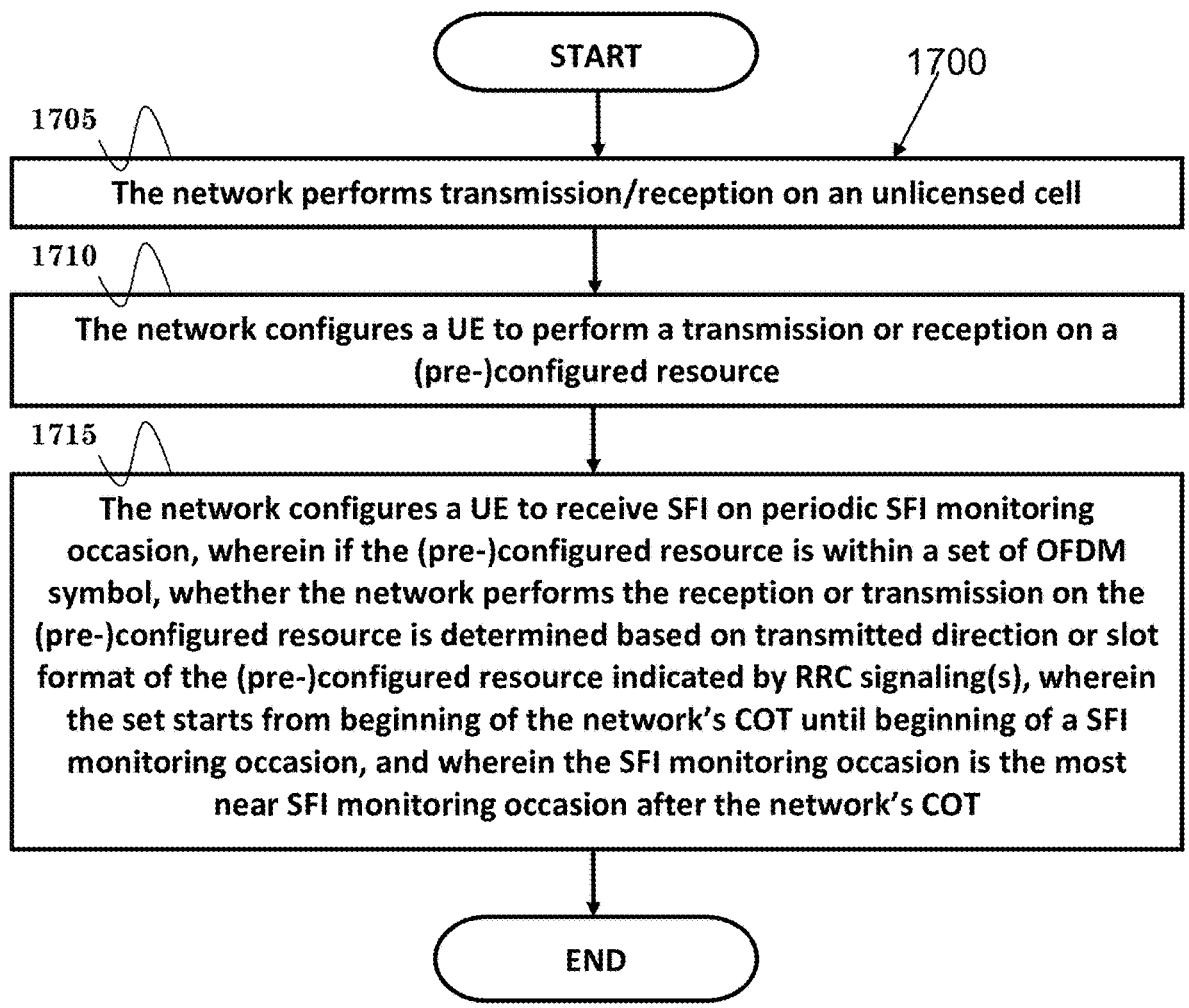
FIG. 17 is a flow chart according to one exemplary embodiment.

FIG. 17 is a flow chart 1700 according to one exemplary embodiment from the perspective of a network. In step 1705, the network performs transmission/reception on an unlicensed cell. In step 1710, the network configures a UE to perform a transmission or reception on a (pre-)configured resource. In step 1715, the network configures a UE to receive SFI on periodic SFI monitoring occasion, wherein if the (pre-)configured resource is within a set of OFDM symbol, whether the network performs the reception or transmission on the (pre-)configured resource is determined based on transmitted direction or slot format of the (pre-)configured resource indicated by RRC signaling(s), wherein the set starts from beginning of the network's COT until beginning of a SFI monitoring occasion, and wherein the SFI monitoring occasion is the most near SFI monitoring occasion after the network's COT.

Referring back to FIGS. 3 and 4, in one exemplary embodiment of a network, the device 300 includes a program code 312 stored in the memory 310. The CPU 308 could execute program code 312 to enable the network (i) to perform transmission/reception on an unlicensed cell, (ii) to configure a UE to perform a transmission or reception on a (pre-)configured resource, (iii) to configure a UE to receive SFI on periodic SFI monitoring occasion, wherein if the (pre-)configured resource is within a set of OFDM symbol, whether the network performs the reception or transmission on the (pre-)configured resource is determined based on transmitted direction or slot format of the (pre-)configured resource indicated by RRC signaling(s), wherein the set starts from beginning of the network's COT until beginning of a SFI monitoring occasion, and wherein the SFI monitoring occasion is the most near SFI monitoring occasion after the network's COT. Furthermore, the CPU 308 can execute the program code 312 to perform all of the above-described actions and steps or others described herein.

Figure 18:
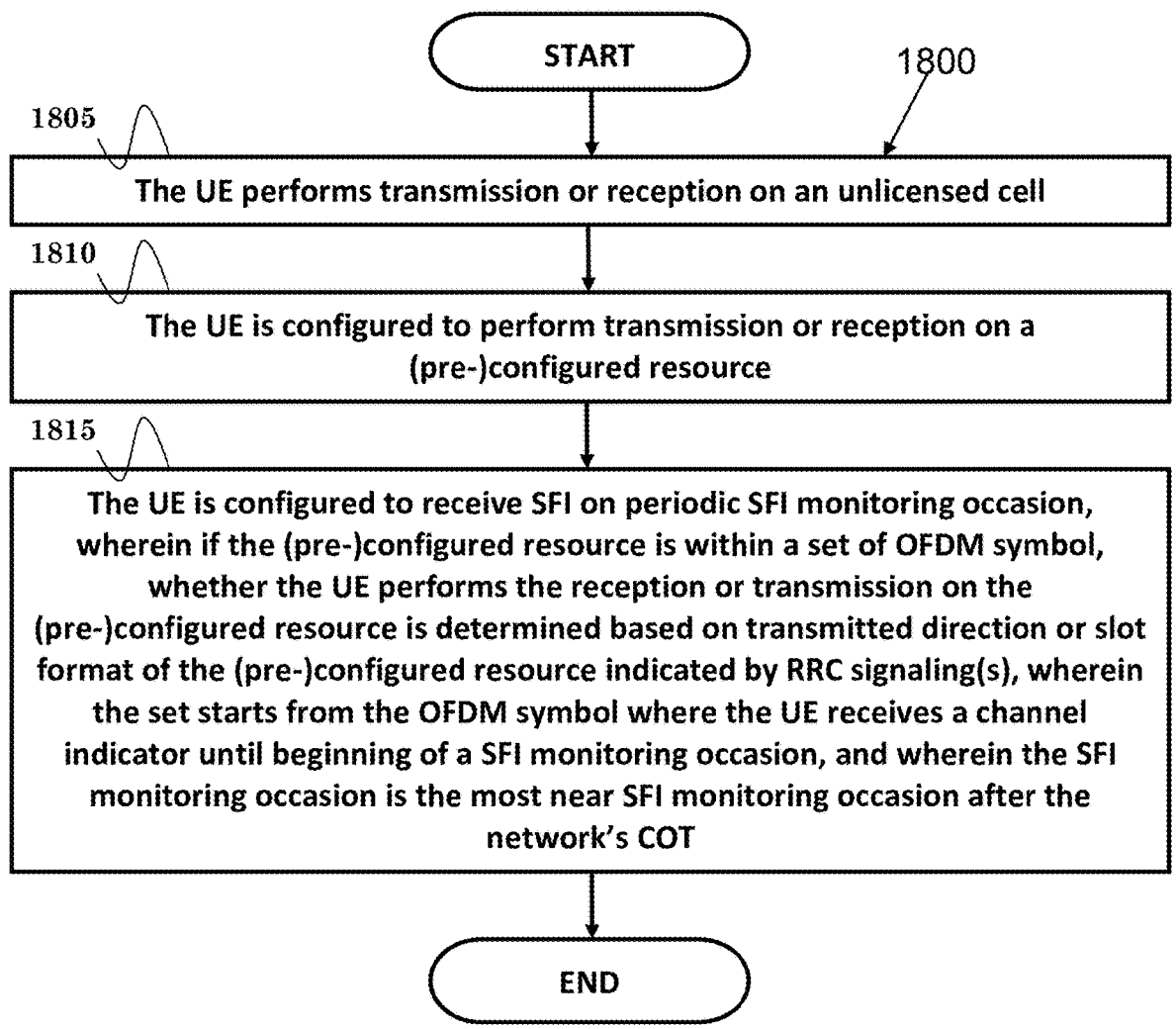
FIG. 18 is a flow chart according to one exemplary embodiment.

FIG. 18 is a flow chart 1800 according to one exemplary embodiment from the perspective of a UE. In step 1805, the UE performs transmission/reception on an unlicensed cell. In step 1810, the UE is configured to perform transmission or reception on a (pre-)configured resource. In step 1815, the UE is configured to receive slot format indication (SFI) on periodic SFI monitoring occasion, wherein if the (pre-)configured resource is within a set of OFDM symbol, whether the UE performs the reception or transmission on the (pre-)configured resource is determined based on transmitted direction/slot format of the (pre-)configured resource indicated by RRC signaling(s), wherein the set starts from the OFDM symbol where the UE receives a channel indicator until beginning of a SFI monitoring occasion, and wherein the SFI monitoring occasion is the most near SFI monitoring occasion after the network's COT.

Referring back to FIGS. 3 and 4, in one exemplary embodiment of a UE, the device 300 includes a program code 312 stored in the memory 310. The CPU 308 could execute program code 312 to enable the UE (i) to perform transmission/reception on an unlicensed cell, (ii) to be configured to perform transmission or reception on an (pre-)configured resource, and (iii) to be configured to receive slot format indication (SFI) on periodic SFI monitoring occasion, wherein if the (pre-)configured resource is within a set of OFDM symbol, whether the UE performs the reception or transmission on the (pre-)configured resource is determined based on transmitted direction/slot format of the (pre-)configured resource indicated by RRC signaling(s), wherein the set starts from the OFDM symbol where the UE receives a channel indicator until beginning of a SFI monitoring occasion, and wherein the SFI monitoring occasion is the most near SFI monitoring occasion after the network's COT. Furthermore, the CPU 308 can execute the program code 312 to perform all of the above-described actions and steps or others described herein.

In the context of the embodiments illustrated in FIGS. 17 and 18 and described above, in one embodiment, the RRC signaling(s) could be one or combination of following parameters: tdd-UL-DL-ConfigurationCommon, tdd-UL-DL-ConfigurationCommon2, and tdd-UL-DL-ConfigDedicated. The configured transmission could be configured grant transmission, grant free transmission, SRS transmission, report of configured downlink measurement, or uplink transmission. The configured reception could also be CORESET monitoring, downlink reference signal measurement, CSI-RS measurement, SS-PBCH block measurement, or SPS-PDSCH reception.

In one embodiment, if the UE does not receive a SFI on a SFI monitoring occasion after the UE detects the channel indicator, the UE may assume SFI miss or SFI is not detected. Furthermore, if the UE does not receive a SFI on a SFI monitoring occasion after the UE detects the channel indicator, the UE may not perform the configured transmission and/or the configured reception except perform CORESET monitoring. In addition, if the UE does not receive a SFI on a SFI monitoring occasion before the UE detects the channel indicator wherein the SFI indicates slot format of the set of OFDM symbol(s), the UE could ignore SFI miss.

In one embodiment, a SFI received in an SFI monitoring occasion could at least indicates slot format of slots from the SFI monitoring occasion to next SFI monitoring occasion. A SFI could be carried by a downlink control information (DCI). The DCI could be DCI format 2_0. The SFI monitoring occasion(s) could be configured by periodicity and offset of DCI format 2_0. A SFI could indicate slot format of one or more than one slot.

In one embodiment, the channel indicator could indicate (starting of) a network's channel occupancy time (COT). The channel indicator could be a reference signal, (one of) DMRS of CORESET, a common signal, or a group common signal.

In one embodiment, the network could transmit the channel indicator if/after/once the network occupied the channel. If/after the network performs channel access procedure/LBT schemes successfully, the network could transmit the channel indicator. If/after the UE detects the channel indicator, the UE could be aware of (starting of) the network's COT. Furthermore, if/after the UE detects the channel indicator, the UE could ignore SFI miss when determining slot format of the set of OFDM symbol(s). In addition, if/after the UE detects the channel indicator, the UE could ignore a SFI transmitted on an SFI monitoring occasion before the UE detects the channel indicator. Also, if/after the UE detects the channel indicator, the UE could assume slot format of the set of OFDM symbol is determined based on the RRC signaling(s).

Figure 19:
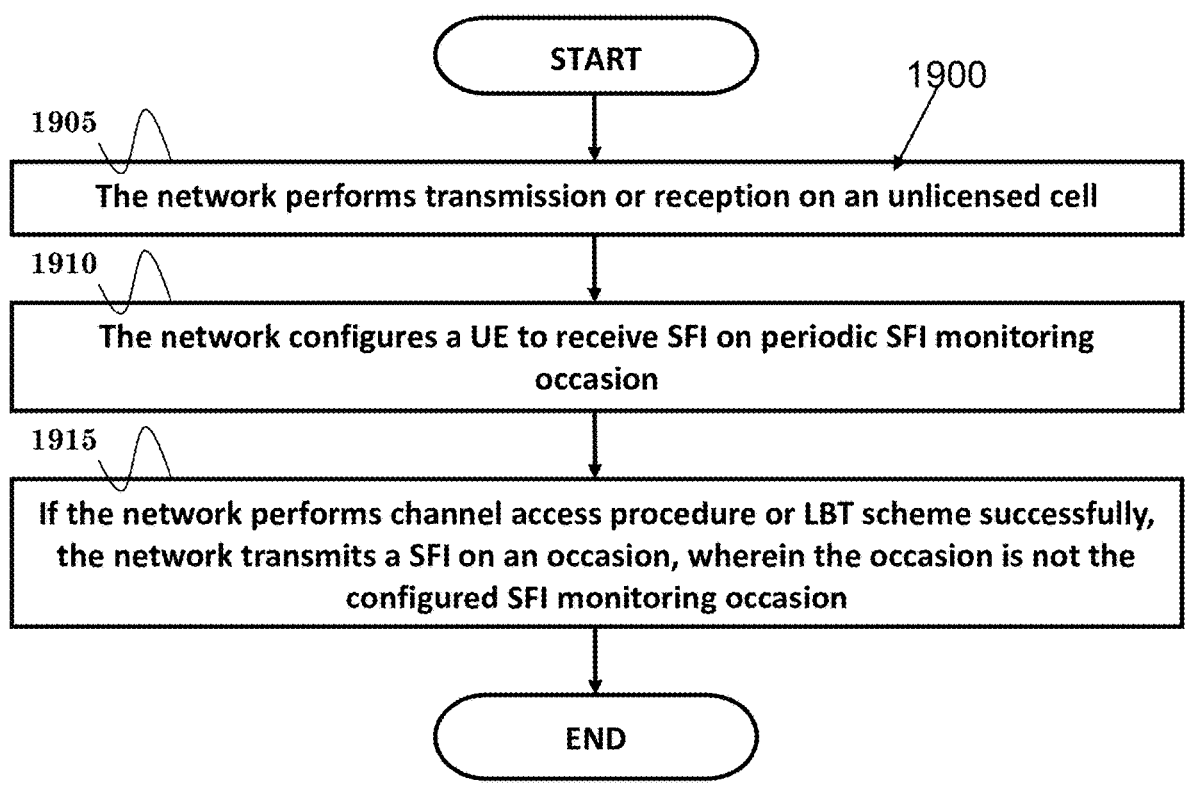
FIG. 19 is a flow chart according to one exemplary embodiment.

FIG. 19 is a flow chart 1900 according to one exemplary embodiment from the perspective of a network. In step 1905, the network performs transmission/reception on an unlicensed cell. In step 1910, the network configures a UE to receive SFI on periodic SFI monitoring occasion. In step 1915, if the network performs channel access procedure or LBT scheme successfully, the network transmits a SFI on an occasion, wherein the occasion is not the configured SFI monitoring occasion.

Referring back to FIGS. 3 and 4, in one exemplary embodiment of a network, the device 300 includes a program code 312 stored in the memory 310. The CPU 308 could execute program code 312 to enable the network (i) to perform transmission/reception on an unlicensed cell, (ii) to configure a UE to receive SFI on periodic SFI monitoring occasion, and (iii) to transmit a SFI on an occasion if the network performs channel access procedure or LBT scheme successfully, wherein the occasion is not the configured SFI monitoring occasion. Furthermore, the CPU 308 can execute the program code 312 to perform all of the above-described actions and steps or others described herein.

Figure 20:
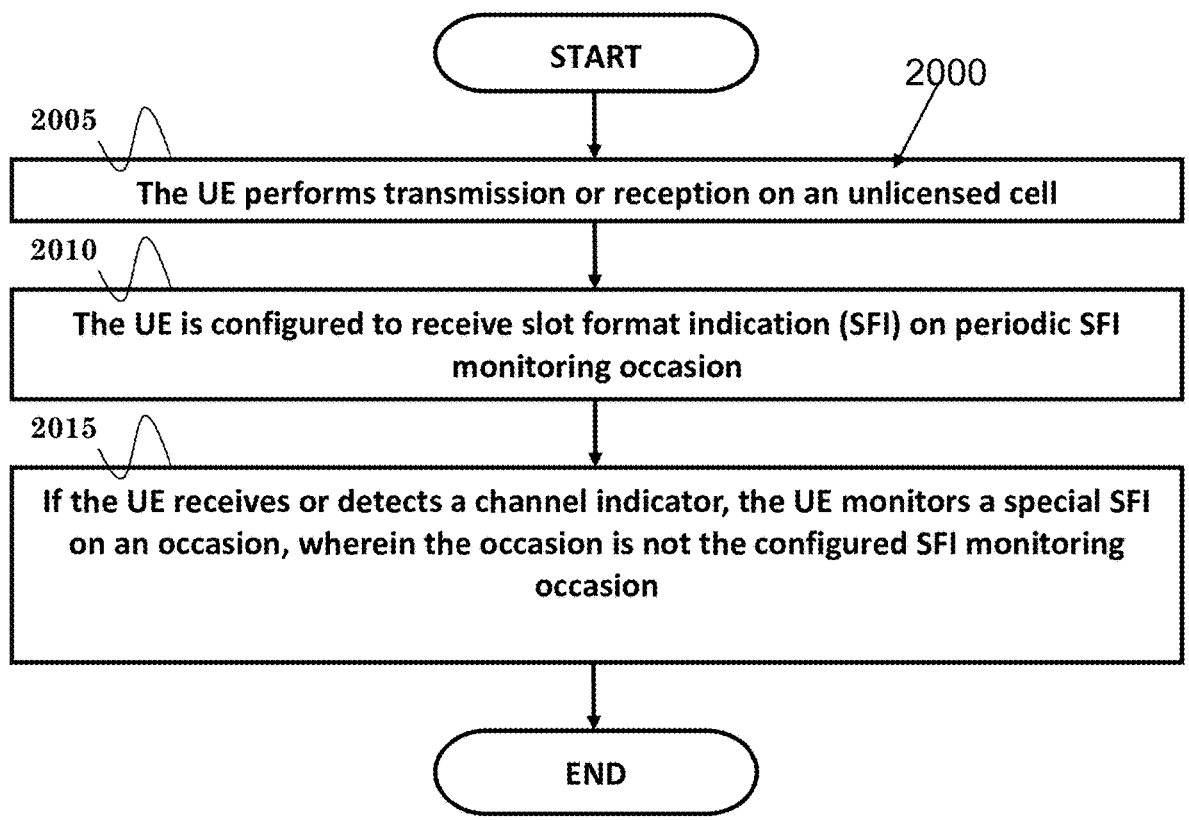
FIG. 20 is a flow chart according to one exemplary embodiment.

FIG. 20 is a flow chart 2000 according to one exemplary embodiment from the perspective of a UE. In step 2005, the UE performs transmission or reception on an unlicensed cell. In step 2010, the UE is configured to receive slot format indication (SFI) on periodic SFI monitoring occasion. In step 2015, if the UE receives or detects a channel indicator, the UE monitors a special SFI on an occasion, wherein the occasion is not the configured SFI monitoring occasion.

Referring back to FIGS. 3 and 4, in one exemplary embodiment of a UE, the device 300 includes a program code 312 stored in the memory 310. The CPU 308 could execute program code 312 to enable the UE (i) to perform transmission or reception on an unlicensed cell, (ii) to be configured to receive slot format indication (SFI) on periodic SFI monitoring occasion, and (iii) to monitor a special SFI on an occasion if the UE receives or detects a channel indicator, wherein the occasion is not the configured SFI monitoring occasion. Furthermore, the CPU 308 can execute the program code 312 to perform all of the above-described actions and steps or others described herein.

In the context of the embodiments illustrated in FIGS. 19 and 20 and described above, the occasion could be a CORESET and/or a search space monitoring occasion after the UE receives the channel indicator or after the network performs channel access procedure or LBT scheme successful. The occasion could be the most recent CORESET and/or search space monitoring occasion after the UE receives the channel indicator, or after the network performs channel access procedure or LBT scheme successful. The occasion could occur on slot/OFDM symbol, where the UE receives the channel indicator or the special SFI. The occasion could also occur on middle of a slot, or the beginning of a slot.

In one embodiment, if the UE does not receive the special SFI, the UE may consider SFI miss or not detect the SFI on OFDM symbols from beginning of the CORESET until next (SFI) monitoring occasion. Also, if the UE does not receive the special SFI, the UE may not perform configured transmission or reception except CORESET monitoring on OFDM symbols from the CORESET until next (SFI) monitoring occasion.

In one embodiment, the configured transmission could be configured grant transmission, grant free transmission, SRS transmission, report of configured downlink measurement, or uplink transmission. The configured reception could also be CORESET monitoring, downlink reference signal measurement, CSI-RS measurement, SS-PBCH block measurement, or SPS-PDSCH reception.

In one embodiment, the channel indicator could indicate the starting of a network's channel occupancy time (COT). The signal could be a reference signal, (one of) DMRS of CORESET, a common signal, or a group common signal.

In one embodiment, the network could transmit the channel indicator if/after/once the network occupied the channel, and/or the network performs channel access procedure or LBT schemes successfully. If/after the UE detects the channel indicator, the UE could be aware of starting of the network's COT, and/or the UE could ignore SFI miss when determining slot format of the set of OFDM symbol(s). Furthermore, if/after the UE detects the channel indicator, the UE could ignore a SFI transmitted on an SFI monitoring occasion before the UE detects the channel indicator, and/or the UE could assume slot format of the set of OFDM symbol is determined based on the RRC signaling(s).

Figure 21:
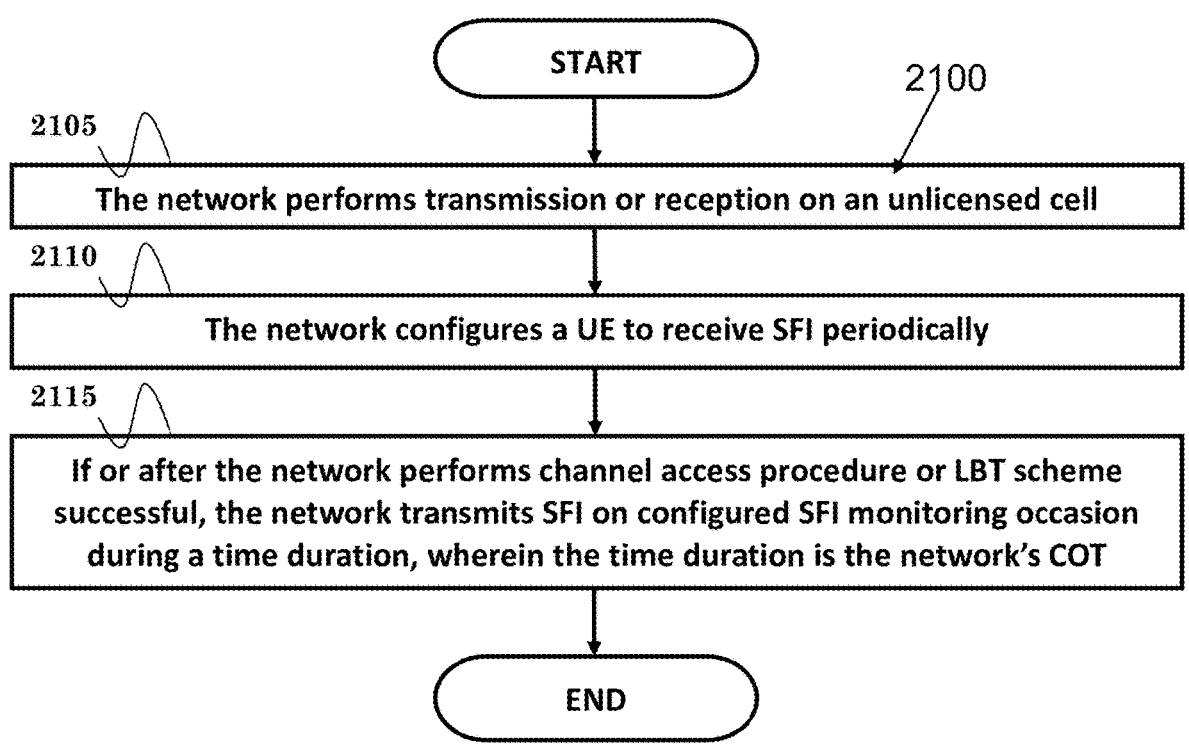
FIG. 21 is a flow chart according to one exemplary embodiment.

FIG. 21 is a flow chart 2100 according to one exemplary embodiment from the perspective of a network. In step 2105, the network performs transmission or reception on an unlicensed cell. In step 2110, the network configures a UE to receive SFI periodically. In step 2115, if or after the network performs channel access procedure or LBT scheme successful, the network transmits SFI on configured SFI monitoring occasion during a time duration, wherein the time duration is the network's COT.

Referring back to FIGS. 3 and 4, in one exemplary embodiment of a network, the device 300 includes a program code 312 stored in the memory 310. The CPU 308 could execute program code 312 to enable the network (i) to perform transmission or reception on an unlicensed cell, (ii) to configure a UE to receive SFI periodically, and (iii) to transmit SFI on configured SFI monitoring occasion during a time duration if or after the network performs channel access procedure or LBT scheme successful, wherein the time duration is the network's COT. Furthermore, the CPU 308 can execute the program code 312 to perform all of the above-described actions and steps or others described herein.

Figure 22:
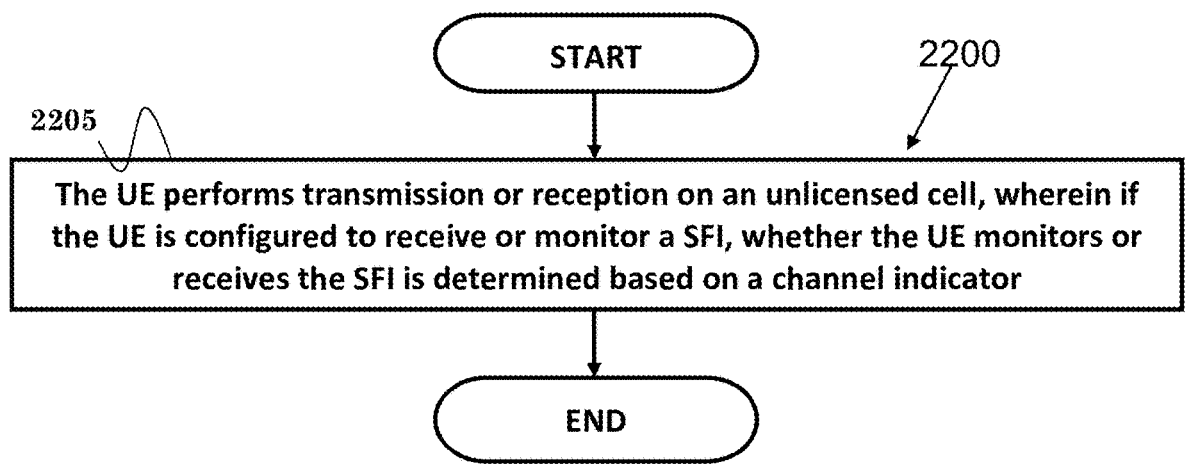
FIG. 22 is a flow chart according to one exemplary embodiment.

FIG. 22 is a flow chart 2200 according to one exemplary embodiment from the perspective of a UE. In step 2205, the UE performs transmission or reception on an unlicensed cell, wherein if the UE is configured to receive or monitor a SFI, whether the UE monitors or receives the SFI is determined based on a channel indicator.

Referring back to FIGS. 3 and 4, in one exemplary embodiment of a UE, the device 300 includes a program code 312 stored in the memory 310. The CPU 308 could execute program code 312 to enable the UE to perform transmission or reception on an unlicensed cell, wherein if the UE is configured to receive or monitor a SFI, whether the UE monitors or receives the SFI is determined based on a channel indicator. Furthermore, the CPU 308 can execute the program code 312 to perform all of the above-described actions and steps or others described herein.

In the context of the embodiments illustrated in FIGS. 21 and 22 and described above, in one embodiment, if or after the network performs channel access procedure or LBT scheme successful, the network could transmit a channel indicator. Furthermore, before the network transmits the channel indicator, the network may not transmit the SFI. In addition, before the network performs channel access procedure or LBT scheme successful or before the network occupied a channel or medium, the network may not transmit the SFI.

In one embodiment, if or after the network transmits the channel indicator, the network could transmit SFI on configured SFI monitoring occasion during a time duration. The time duration could start from OFDM symbol, where the UE detects the channel indicator. Ending position of the time duration could be determined based on either an indication for the UE indicating ending position or a maximum value. The maximum value could refer to maximum channel occupancy time of a (channel access or LBT) priority class of the network.

In one embodiment, the network could transmit the indication to a UE for indicating ending position of the time duration. The channel indicator could indicate the starting of a network's COT. The channel indicator could be a reference signal, or (one of) DMRS of CORESET, a common signal, and a group common signal.

In one embodiment, the network could transmit the channel indicator if or after the network occupied the channel or if (or after) the network performs channel access procedure or LBT schemes successfully.

In one embodiment, if or after the UE detects the channel indicator, the UE could be aware of starting of the network's COT or the UE could ignore SFI miss when determining slot format of the set of OFDM symbol(s). Furthermore, if or after the UE detects the channel indicator, the UE could ignore a SFI transmitted on an SFI monitoring occasion before the UE detects the channel indicator, or the UE could assume slot format of the set of OFDM symbol is determined based on the RRC signaling(s), the RRC signaling(s) could be one or a combination of the following parameters: tdd-UL-DL-ConfigurationCommon, tdd-UL-DL-ConfigurationCommon2, and tdd-UL-DL-ConfigDedicated.

In one embodiment, the configured transmission could be configured grant transmission, grant free transmission, SRS transmission, report of configured downlink measurement, or uplink transmission. The configured reception could be control resource set (CORESET) monitoring, downlink reference signal measurement, CSI-RS measurement, SS-PBCH block measurement, or SPS-PDSCH reception.

In one embodiment, a SFI received in an SFI monitoring occasion could at least indicate slot format of slots from the SFI monitoring occasion to next SFI monitoring occasion. A SFI could be carried by a DCI. The DCI could be DCI format 2_0. SFI monitoring occasion(s) could be configured by periodicity and offset of DCI format 2_0. The SFI could indicate slot format of one or more than one slot.

Figure 23:
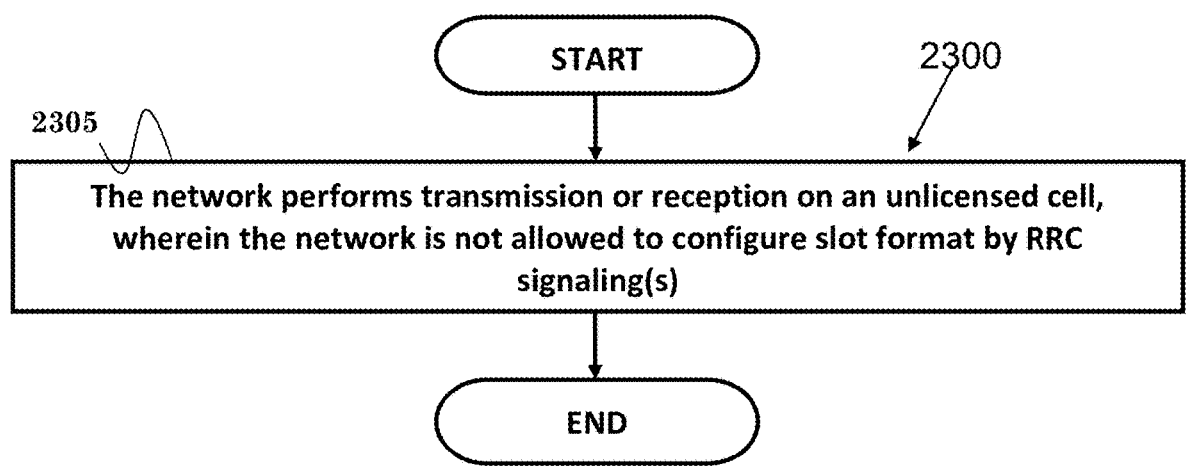
FIG. 23 is a flow chart according to one exemplary embodiment.

FIG. 23 is a flow chart 2300 according to one exemplary embodiment from the perspective of a network. In step 2305, the network performs transmission or reception on an unlicensed cell, wherein the network is not allowed to configure slot format by RRC signaling(s).

Referring back to FIGS. 3 and 4, in one exemplary embodiment of a network, the device 300 includes a program code 312 stored in the memory 310. The CPU 308 could execute program code 312 to enable the network to perform transmission or reception on an unlicensed cell, wherein the network is not allowed to configure slot format by RRC signaling(s). Furthermore, the CPU 308 can execute the program code 312 to perform all of the above-described actions and steps or others described herein.

Figure 24:
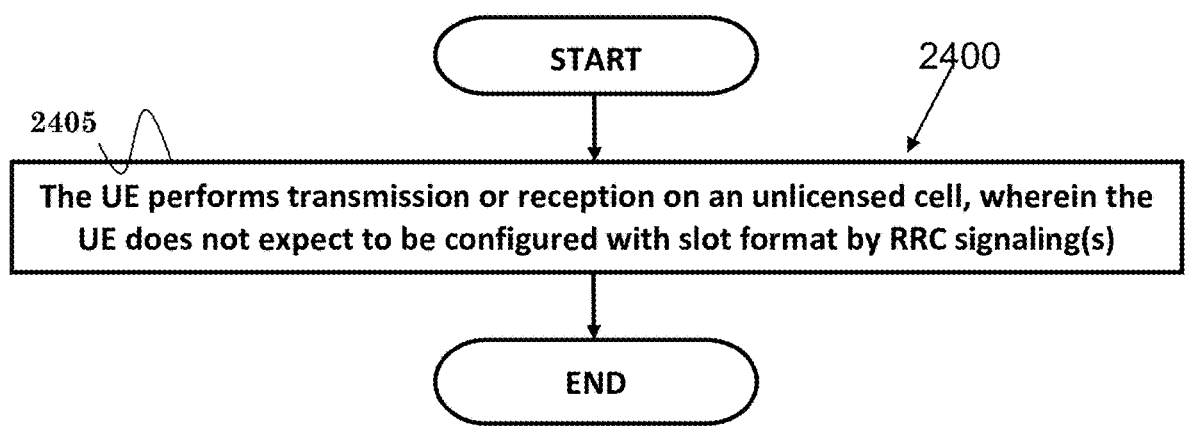
FIG. 24 is a flow chart according to one exemplary embodiment.

FIG. 24 is a flow chart 2400 according to one exemplary embodiment from the perspective of a UE. In step 2405, the UE performs transmission or reception on an unlicensed cell, wherein the UE does not expect to be configured with slot format by RRC signaling(s).

Referring back to FIGS. 3 and 4, in one exemplary embodiment of a UE, the device 300 includes a program code 312 stored in the memory 310. The CPU 308 could execute program code 312 to enable the UE to perform transmission or reception on an unlicensed cell, wherein the UE does not expect to be configured with slot format by RRC signaling(s). Furthermore, the CPU 308 can execute the program code 312 to perform all of the above-described actions and steps or others described herein.

In the context of the embodiments illustrated in FIGS. 23 and 24 and described above, in one embodiment, the RRC signaling(s) could be one or a combination of following parameters: tdd-UL-DL-ConfigurationCommon, tdd-UL-DL-ConfigurationCommon2, and tdd-UL-DL-ConfigDedicated.

In one embodiment, the UE could be configured to receive SFI periodically. The UE could receive SFI if or after the UE receives a channel indicator. Before the UE receives the channel indicator, the UE may not receive SFI, and/or the UE could assume slot format of OFDM symbols or slots is flexible. Furthermore, before the UE receives the channel indicator, the UE could monitor for the channel indicator. In addition, before the UE receives the channel indicator, the UE may not perform configured transmission or reception except monitors for the channel indicator.

In one embodiment, the network could indicate slot format by SFI. If or after the network performs channel access procedure or LBT scheme successful, the network could transmit a channel indicator. If or after the network transmits the channel indicator, the network could transmit SFI on configured SFI monitoring occasion during the network's COT. The channel indicator could indicate starting of a network's COT. The channel indicator could be a reference signal, and (one of) DMRS of CORESET, a common signal, or a group common signal.

In one embodiment, the network could transmit the channel indicator if or after the network occupied the channel, or if or after the network performs channel access procedure or LBT schemes successfully. If or after the UE detects the channel indicator, the UE could be aware of starting of the network's COT. Furthermore, if or after the UE detects the channel indicator, the UE could ignore SFI miss when determining slot format of the set of OFDM symbol(s), and/or the UE could ignore a SFI transmitted on an SFI monitoring occasion before the UE detects the channel indicator. In addition, if or after the UE detects the channel indicator, the UE could assume slot format of the set of OFDM symbol is determined based on the RRC signaling(s).

In one embodiment, a SFI received in an SFI monitoring occasion could at least indicate slot format of slots from the SFI monitoring occasion to next SFI monitoring occasion. A SFI could be carried by a DCI. The DCI could be DCI format 2_0. SFI monitoring occasion(s) could be configured by periodicity and offset of DCI format 2_0. The SFI could indicate slot format of one or more than one slot.

In NR licensed band operation, a DCI format 2_0 could be configured by gNB to indicate one or more slot formats for one or more serving cells, which means SFI of one serving cell could be indicated by another one serving cell. However, if SFI of an unlicensed cell is indicated by another one serving cell, some ambiguous conditions may happen due to transmission uncertainty in the unlicensed cell.

Figure 14:
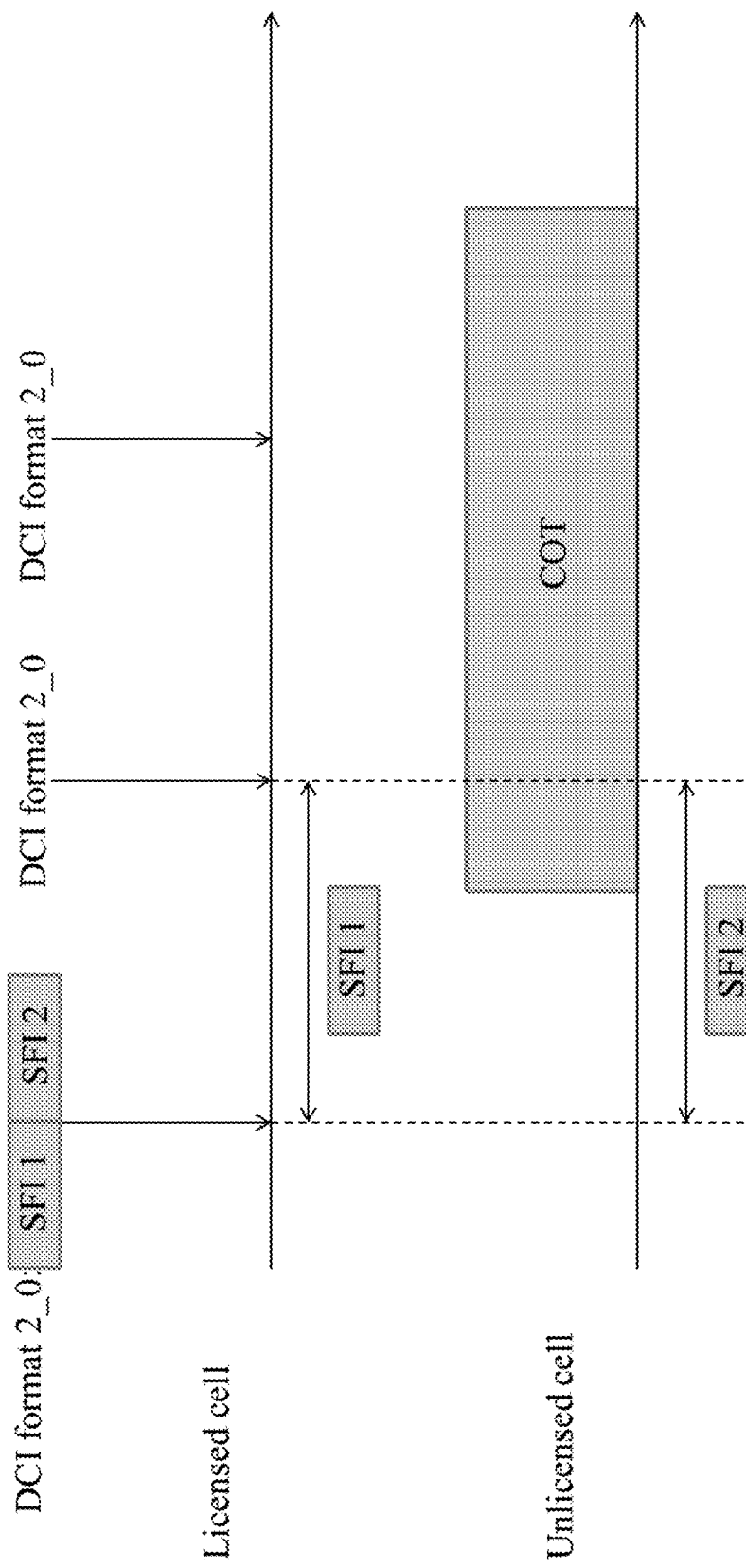
FIG. 14 is a diagram according to one exemplary embodiment.

For example, in FIG. 14, assuming a UE is configured to receive DCI format 2_0 in a NR licensed cell and there is a DCI format 2_0 indicating SFI 1 for the NR licensed cell and SFI 2 for a NR unlicensed cell. In this example, if the first DCI format 2_0 occasion in FIG. 14 is outside network's channel occupancy time, how UE treats the SFI 2 received in the licensed cell. In a similar example, if the UE is configured to receive DCI format 2_0 in an unlicensed cell and there is a DCI format 2_0 indicating a SFI for a licensed cell and another SFI for the unlicensed cell, SFI missing cases may occur frequently. Based on above, how to handle SFI indication in or for unlicensed spectrum considering cross carrier or cell indication needs to be further studied. Possible solutions for the issue are described below.

One general concept is that if a UE receives a slot format indication (SFI) and/or a slot format combination for an unlicensed serving cell, wherein the slot format indication and/or the slot format combination is transmitted in a licensed serving cell and outside a channel occupation time in the unlicensed serving cell, the UE may perform a behavior. In one embodiment, before the UE receives a channel indicator, if a UE receives in a licensed serving cell a slot format indication (SFI) and/or a slot format combination for an unlicensed serving cell, the UE may perform a behavior. The behavior could be that the UE may discard or ignore the SFI or that the UE may buffer the SFI until next (available) SFI monitoring occasion or the UE receives a channel indicator or the UE detects or be indicated a channel occupation. The behavior could also be that the UE may apply the (buffered) SFI from (the beginning of) slot or OFDM symbol where the UE receives a channel indicator or the UE detects a channel occupation by network or from next (available) SFI monitoring occasion. Furthermore, the behavior could be that whether or not the UE applies the SFI is determined based on a channel indicator.

In one embodiment, the channel indicator could be used for indicating (starting of) a channel occupation or a channel occupation time. The channel occupation time could be obtained by network or the UE.

Another general concept could be one or more limitation or restriction may be applied on a network when indicating a cross-cell SFI. The network may not be allowed to configure a serving cell indicating slot format(s) for an unlicensed serving cell. Furthermore, the network may not be allowed to configure that slot format(s) for an unlicensed cell is indicated by DCI format 2_0 received in a licensed cell.

In one embodiment, a network may not be allowed to configure DCI format 2_0 transmitted in an unlicensed serving cell and indicating slot format(s) for other serving cell(s), at least for licensed serving cells. Also, a network may not be allowed to configure DCI format 2_0 transmitted in an unlicensed serving cell and cross-cell indicating slot format(s) for other serving cell(s). In addition, a network may not be allowed to configure DCI format 2_0 transmitted in an unlicensed serving cell and indicating slot format(s) for licensed serving cell(s).

In one embodiment, if a network transmits slot format indication (SFI) for an unlicensed serving cell in a licensed serving cell before performing channel access procedure or LBT scheme (successfully) in the unlicensed serving cell, the network is not allowed to indicate slot format value(s) for the unlicensed serving cell other than a particular slot format value in the SFI. The particular slot format value could indicate slot format value 255 or a slot format value intended for indicating slot structure in unlicensed spectrum.

Another general concept is for an unlicensed serving cell, the UE does not expect to receive a SFI indicating slot format value(s) other than slot format values 255 before the UE receives a channel indicator or before the UE detects a channel occupation by network. In one embodiment, after the end of a channel occupation (or last channel occupation) and until the UE receives the channel indicator, the UE may not apply the SFI for the unlicensed cell. Before the UE receives the channel indicator, the UE may not apply slot format value other than 255 for the unlicensed cell. Furthermore, after the end of a channel occupation (or last channel occupation) and until the UE receives the channel indicator, the UE may not apply slot format value other than 255 for the unlicensed cell. After/if the UE receives the channel indicator, the UE could apply a slot format value 255 for the unlicensed cell.

In one embodiment, the channel indicator could indicate a starting position of a time duration. The channel indicator could be transmitted within a time duration. The time duration could be the network's channel occupancy time (COT).

Any concepts mentioned above can form or be combined to form an embodiment.

Embodiment 1—A UE communicates with a first cell and a second cell. The UE could be configured to receive channel and/or signal in a first (serving) cell and/or in a second (serving) cell. Furthermore, the UE could be configured to transmit channel and/or signal in the first (serving) cell and/or in the second (serving) cell.

The UE could be configured to receive a downlink control information (DCI) on periodic monitoring occasion(s) in the first cell. The DCI could indicate or comprise a first slot format indication (SFI) and a second SFI. The first SFI could indicate slot format for the first cell, and the second SFI could indicate slot format for the second cell.

In one embodiment, if the UE receives the DCI in the first cell before the UE detects or receives a channel indicator or before the UE detects or be indicated a channel occupation, the UE may discard or ignore the second SFI. The UE may not expect to receive a DCI indicating the first SFI and the second SFI in the first (serving) cell. Furthermore, the UE may not expect to receive a DCI indicating the first SFI and the second SFI in the first (serving) cell before the UE receives or detects a channel indicator or before the UE detects or be indicated a channel occupation.

In one embodiment, if the UE receives the DCI in the first cell before the UE detects or receives a channel indicator or before the UE detects or be indicated a channel occupation, the UE may buffer the second SFI. The UE may (also) buffer the second SFI until the next (available) monitoring occasion of the DCI or until the UE receives the channel indicator or the UE detects or be indicated a channel occupation. Furthermore, the UE may apply the second SFI if the UE receives the channel indicator or the UE detects or be indicated a channel occupation. An available SFI monitoring occasion could be a SFI monitoring occasion within a channel occupation time.

Slot format values in the second SFI could indicate slot format of one or more than one slot starting from the slot where the UE receives the DCI. For example, assuming a UE is configured to receive a DCI format 2_0 every 5 slots in a first cell and the DCI format 2_0 indicates a first SFI and a second SFI. The first SFI indicates slot format(s) for the first cell. The second SFI indicates slot format(s) for the second cell. In this example, if the UE receives the DCI format 2_0 in slot #n, the second SFI indicates multiple slot format values as {0, 2, 5, 6, 7} and the UE receives a channel indicator and/or detects a channel occupation in slot #n+2, the UE applies slot format value {5} for slot #n+2, slot format value {6} for slot #n+3, and slot format value {7} for slot #n+4. In a similar example, if the UE receives a channel indicator and/or detects a channel occupation on OFDM symbol #m of slot #n+2, the UE applied a part of slot format value {5} for slot #n+2.

In one embodiment, the part could start from OFDM symbol #m to the last OFDM symbol of slot format #n+2 or to symbol functionality of the last OFDM symbol of slot format #n+2. Alternatively, the part could start from OFDM symbol #0 to OFDM symbol #13-m of slot format #n+2. Furthermore, the part could start from symbol functionality of OFDM symbol #m to symbol functionality of OFDM symbol #13-m of slot format #n+2 or to symbol functionality of OFDM symbol #13 of slot format #n+2.

In one embodiment, a SFI could indicate a slot combination for a serving cell. A slot combination could comprise one or more than one slot format value. Furthermore, a slot format value could indicate slot format of a slot. A slot format value could also indicate transmitted direction or functionality of each of OFDM symbols in a slot.

In one embodiment, the DCI could be DCI format 2_0. The first cell could be a licensed cell or an unlicensed cell, and the second cell could be a licensed cell or an unlicensed cell. In one embodiment, the first cell could be a licensed cell, and the second cell could be an unlicensed cell.

In one embodiment, a SFI received in a monitoring occasion of the DCI could at least indicate slot format of slots from the slot aligning beginning of the monitoring occasion of the DCI to next monitoring occasion of the DCI. The channel indicator could indicate (starting of) a network's channel occupancy time (COT). The UE may assume a network's COT starts from OFDM symbol where the UE receives the channel indicator. The channel indicator could also be a reference signal, (one of) DMRS of CORESET, a common signal, or a group common signal. If/after the UE detects the channel indicator, the UE may assume transmission/reception (on a time duration) is the same as licensed band/spectrum.

Embodiment 2—A network could serve a first cell and a second cell. The network could transmit channel and/or signal in a first (serving) cell and/or in a second (serving) cell. The network could receive channel and/or signal in the first (serving) cell and/or in the second (serving) cell.

The network could transmit to a UE a downlink control information (DCI) on periodic and/or semi-persistent monitoring occasion in the first cell. The network could configure a UE to receive a downlink control information (DCI) on periodic and/or semi-persistent monitoring occasion in the first cell. The DCI could also indicate a first slot format indication (SFI) and a second SFI. The first SFI could indicate slot format for the first cell and the second SFI indicates slot format for the second cell.

In one embodiment, the network may transmit the DCI in the first cell before the network performs a channel access procedure or LBT scheme (successfully). If a network transmits slot format indication (SFI) for an unlicensed cell in a licensed cell before performing channel access procedure or LBT scheme (successfully) in the unlicensed cell, the network may not be allowed to indicate slot format value(s) for the unlicensed serving cell in the SFI, other than a particular slot format value.

In one embodiment, for an unlicensed cell, the UE may not expect to receive SFI indicating a slot format value other than the particular slot format values before the UE receives a channel indicator and/or detects or be indicated the channel occupation time. The particular slot format value could indicate one slot format value 255 or a slot format value intended for slot structure in unlicensed spectrum.

In one embodiment, whether or not the UE applies the SFI for an unlicensed cell could be determined based on a channel indicator. Before the UE receives the channel indicator and/or detects or be indicated the channel occupation (time), the UE may not apply SFI for the unlicensed cell. In particular, before the UE receives the channel indicator and/or detects or be indicated the channel occupation time, the UE may not apply slot format value 255 for the unlicensed cell. After/if the UE receives the channel indicator and/or detects or be indicated the channel occupation time, the UE could apply slot format value 255 for the unlicensed cell.

In one embodiment, the channel indicator could indicate (starting of) a network's channel occupancy time (COT). The channel indicator could be a reference signal, (one of) DMRS of CORESET, a common signal, or a group common signal. If/after the UE detects the channel indicator, the UE may assume transmission/reception (within a time duration) is the same as licensed band/spectrum.

Embodiment 3—A network could configure or indicate slot format indication (SFI) for one or more than one (serving) cells by a downlink control information (DCI). If the DCI is transmitted in a licensed cell, the network may not be allowed to configure/indicate an SFI for an unlicensed cell in the DCI. If the DCI is transmitted in an unlicensed cell, the network may not be allowed to indicate an SFI for a serving cell not operated in an unlicensed spectrum. Alternatively, if the DCI is transmitted in an unlicensed cell, the network may be allowed to indicate an SFI for a serving cell not operated in an unlicensed spectrum.

In one embodiment, the network may not be allowed to configure a licensed (serving) cell indicating or transmitting an SFI for an unlicensed cell. Furthermore, the network may not be allowed to configure an unlicensed (serving) cell indicating or transmitting an SFI for a (serving) cell not operated in unlicensed spectrum.

In one embodiment, if a network configures a UE to receive a DCI format 2_0 in an unlicensed (serving) cell, the network may not be allowed to configure that SFI of (serving) cells other than the unlicensed cell is indicated by the DCI format 2_0. Furthermore, if a network configures a UE to receive a DCI format 2_0 in an unlicensed (serving) cell, the network may not be allowed to configure that SFI of (serving) cells other than the licensed cell is indicated by the DCI format 2_0.

In one embodiment, if a network configures a UE to receive a DCI format 2_0 in an unlicensed (serving) cell, the network may not be allowed to configure that SFI of a licensed (serving) cell is indicated by the DCI format 2_0. Furthermore, if a network configures a UE to receive a DCI format 2_0 in a licensed cell, the network may not be allowed to configure that SFI of an unlicensed cell is indicated by the DCI format 2_0. A network may not be allowed to transmit a DCI format 2_0 in a licensed cell indicating slot format for an unlicensed cell.

In one embodiment, a UE may be configured to receive a downlink control information (DCI) indicating slot format indication (SFI) for one or more than one (serving) cells. If the UE is configured to receive the DCI in a licensed cell, the UE may not expect the DCI indicates SFI for an unlicensed cell. Also, if the UE is configured to receive the DCI in an unlicensed cell, the UE may not expect the DCI indicates a SFI for a serving cell not operated in unlicensed spectrum. Furthermore, if the UE is configured to receive the DCI in an unlicensed cell, the UE may not expect the DCI indicates a SFI for a serving cell other than the unlicensed (serving) cell.

All or some of above embodiments can be formed to a new embodiment.

Figure 25:
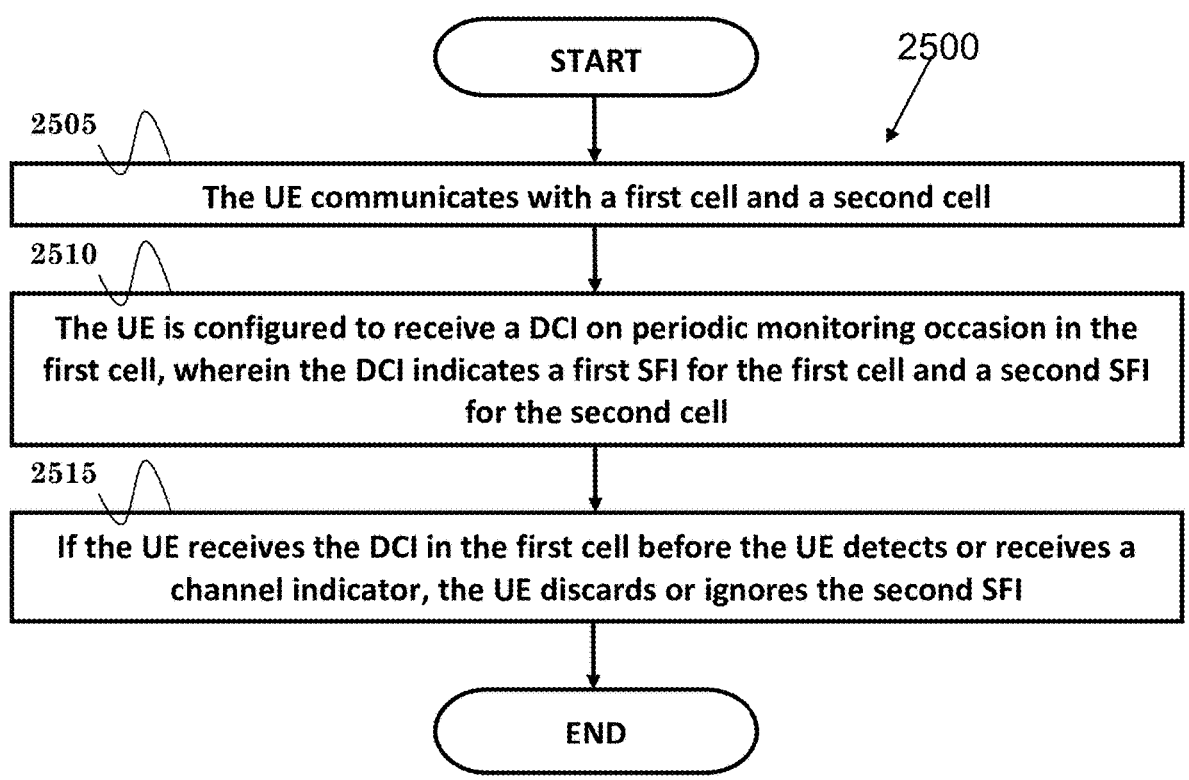
FIG. 25 is a flow chart according to one exemplary embodiment.

FIG. 25 is a flow chart 2500 according to one exemplary embodiment from the perspective of a UE. In step 2505, the UE communicates with a first cell and a second cell. In step 2510, the UE is configured to receive a DCI on periodic monitoring occasion in the first cell, wherein the DCI indicates a first SFI for the first cell and a second SFI for the second cell. In step 2515, if the UE receives the DCI in the first cell before the UE detects or receives a channel indicator, the UE discards or ignores the second SFI.

Referring back to FIGS. 3 and 4, in one exemplary embodiment of a UE, the device 300 includes a program code 312 stored in the memory 310. The CPU 308 could execute program code 312 to enable the UE (i) to communicate with a first cell and a second cell, (ii) to be configured to receive a DCI on periodic monitoring occasion in the first cell, wherein the DCI indicates a first SFI for the first cell and a second SFI for the second cell, and (iii) to discard or ignore the second SFI if the UE receives the DCI in the first cell before the UE detects or receives a channel indicator. Furthermore, the CPU 308 can execute the program code 312 to perform all of the above-described actions and steps or others described herein.

Figure 26:
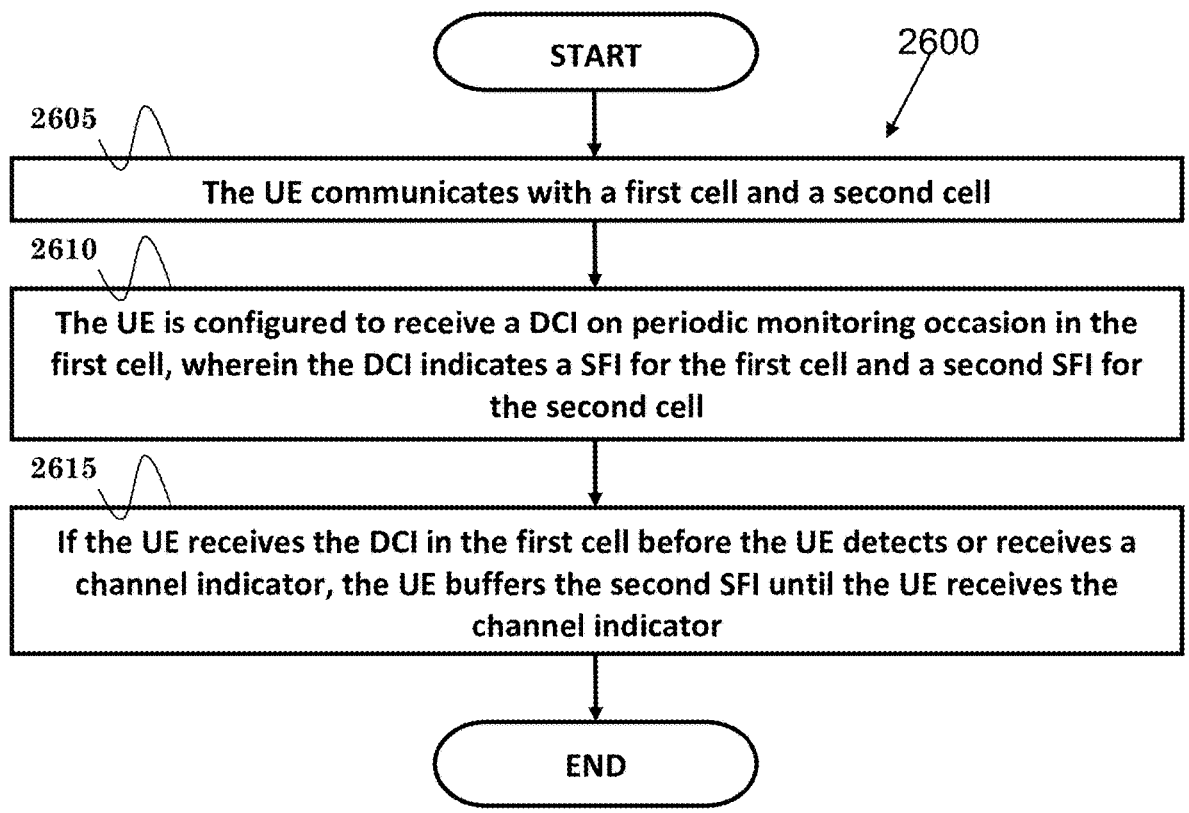
FIG. 26 is a flow chart according to one exemplary embodiment.

FIG. 26 is a flow chart 2600 according to one exemplary embodiment from the perspective of a UE. In step 2605, the UE communicates with a first cell and a second cell. In step 2610, the UE is configured to receive a DCI on periodic monitoring occasion in the first cell, wherein the DCI indicates a SFI for the first cell and a second SFI for the second cell. In step 2615, if the UE receives the DCI in the first cell before the UE detects or receives a channel indicator, the UE buffers the second SFI until the UE receives the channel indicator.

Referring back to FIGS. 3 and 4, in one exemplary embodiment of a UE, the device 300 includes a program code 312 stored in the memory 310. The CPU 308 could execute program code 312 to enable the UE (i) to communicate with a first cell and a second cell, (ii) to be configured to receive a DCI on periodic monitoring occasion in the first cell, wherein the DCI indicates a SFI for the first cell and a second SFI for the second cell, and (iii) to buffer the second SFI until the UE receives the channel indicator if the UE receives the DCI in the first cell before the UE detects or receives a channel indicator. Furthermore, the CPU 308 can execute the program code 312 to perform all of the above-described actions and steps or others described herein.

In the context of the embodiments illustrated in FIGS. 25 and 26 and described above, in one embodiment, the UE could apply the second SFI starting from OFDM symbol where the UE receives the channel indicator until an available SFI monitoring occasion. The available SFI monitoring occasion could be a SFI monitoring occasion within a channel occupation time. Slot format values in the second SFI could indicate slot format of one or more than one slot starting from the slot where the UE receives the DCI. The SFI could indicate a slot combination for a serving cell.

In one embodiment, a slot combination could comprise one or more slot format values. A slot format value could indicate slot format of a slot, and/or transmitted direction or functionality of each OFDM symbols in a slot. The DCI could be DCI format 2_0.

In one embodiment, the first cell could be a licensed cell or an unlicensed cell, and the second cell could be a licensed cell or an unlicensed cell. The SFI received in a monitoring occasion of the DCI could at least indicate slot format of slots from the slot aligning beginning of the monitoring occasion of the DCI to next monitoring occasion of the DCI. The channel indicator could indicate starting of a network's COT. The channel indicator could also indicate starting of a time duration.

In one embodiment, the UE may assume that a network's COT starts from OFDM symbol where the UE receives the channel indicator. Furthermore, a network's COT could start earlier than the network transmits the channel indicator. The channel indicator could be a reference signal, and (one of) DMRS of CORESET, a common signal, and a group common signal. The network could transmit the channel indicator if or after the network occupied the channel, or if or after the network performs channel access procedure or LBT schemes successfully.

Figure 27:
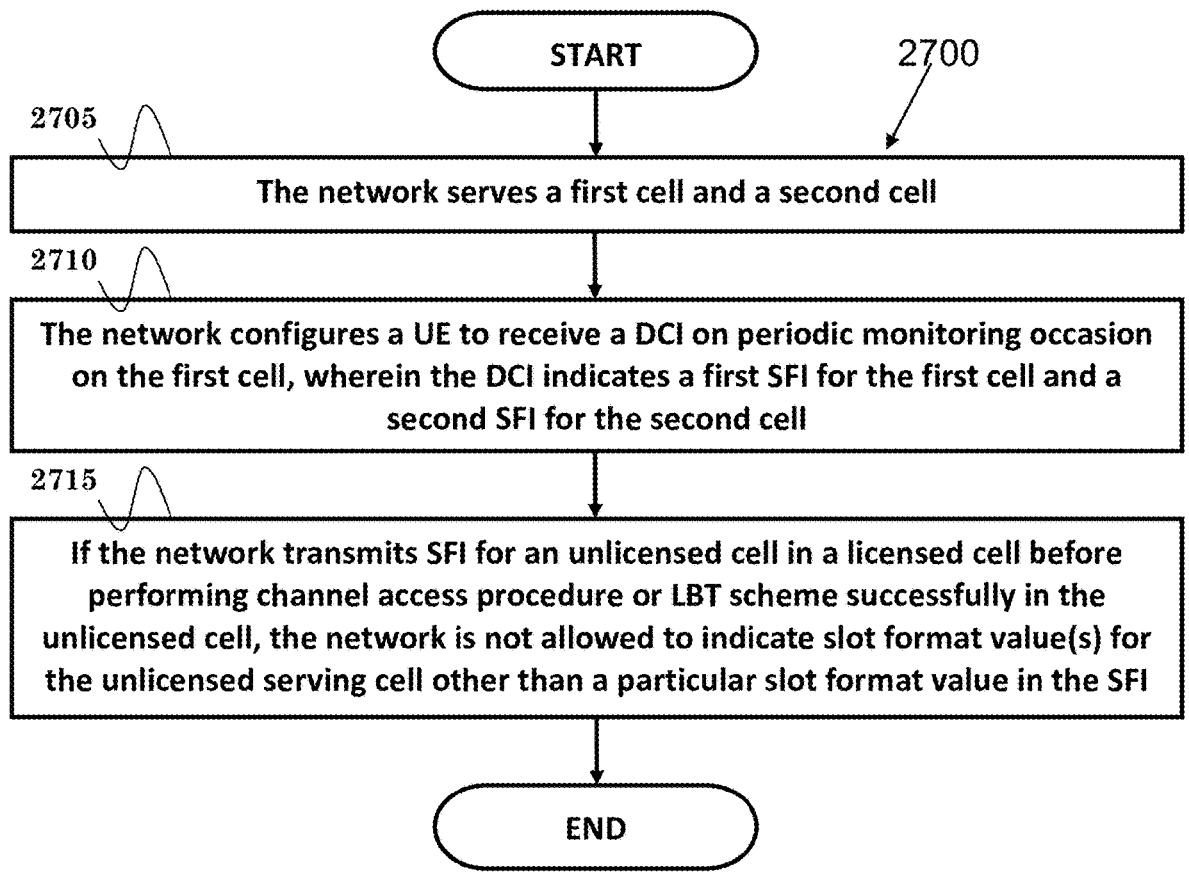
FIG. 27 is a flow chart according to one exemplary embodiment.

FIG. 27 is a flow chart 2700 according to one exemplary embodiment from the perspective of a network. In step 2705, the network serves a first cell and a second cell. In step 2710, the network configures a UE to receive a DCI on periodic monitoring occasion on the first cell, wherein the DCI indicates a first SFI for the first cell and a second SFI for the second cell. In step 2715, if the network transmits SFI for an unlicensed cell in a licensed cell before performing channel access procedure or LBT scheme successfully in the unlicensed cell, the network is not allowed to indicate slot format value(s) for the unlicensed serving cell other than a particular slot format value in the SFI.

In one embodiment, the particular slot format value could indicate one slot format value 255 or a slot format value intended for slot structure in unlicensed spectrum. Furthermore, for an unlicensed cell, the UE may not expect to receive SFI indicating a slot format value other than the particular slot format value before the UE receives a channel indicator and/or detects or be indicated the channel occupation time. In addition, if the network transmits the DCI on the first cell before the network performs channel access procedure or LBT scheme successfully, the network is not allowed to transmit the second SFI indicating slot format value(s) other than the particular slot format value.

In one embodiment, whether the UE applies the SFI for an unlicensed cell could be determined based on a channel indicator. Before the UE receives the channel indicator, the UE may not apply SFI for the unlicensed cell. Furthermore, before the UE receives the channel indicator, the UE may not apply slot format value 255 for the unlicensed cell. In addition, if or after the UE receives the channel indicator, the UE could apply slot format value 255 for the unlicensed cell.

In one embodiment, a SFI could indicate a slot combination for a serving cell. A slot combination could comprise one or more than one slot format value. A slot format value could indicate slot format of each OFDM symbol in a slot, and/or could indicate transmitted direction or functionality of each OFDM symbol in a slot. The DCI could be DCI format 2_0.

In one embodiment, the first cell could be a licensed cell or an unlicensed cell, and the second cell could be a licensed cell or an unlicensed cell. The SFI received in a monitoring occasion of the DCI could at least indicate slot format of slots from the slot aligning beginning of the monitoring occasion of the DCI to next monitoring occasion of the DCI. The channel indicator could indicate starting of a network's channel occupancy time (COT). Furthermore, the channel indicator could indicate starting of a time duration.

In one embodiment, the UE may assume a network's COT starts from OFDM symbol where the UE receives the channel indicator. A network's COT could start earlier than the network transmits the channel indicator. The channel indicator could be a reference signal, and (one of) DMRS of CORESET, a common signal, and a group common signal. The network could transmit the channel indicator if or after the network occupied the channel, or if or after the network performs channel access procedure or LBT schemes successfully.

Referring back to FIGS. 3 and 4, in one exemplary embodiment of a network, the device 300 includes a program code 312 stored in the memory 310. The CPU 308 could execute program code 312 to enable the network (i) to serve a first cell and a second cell, (ii) to configure a UE to receive a DCI on periodic monitoring occasion on the first cell, wherein the DCI indicates a first SFI for the first cell and a second SFI for the second cell, and (iii) to not be allowed to indicate slot format value(s) for the unlicensed serving cell other than a particular slot format value in the SFI if the network transmits SFI for an unlicensed cell in a licensed cell before performing channel access procedure or LBT scheme successfully in the unlicensed cell. Furthermore, the CPU 308 can execute the program code 312 to perform all of the above-described actions and steps or others described herein.

Figure 28:
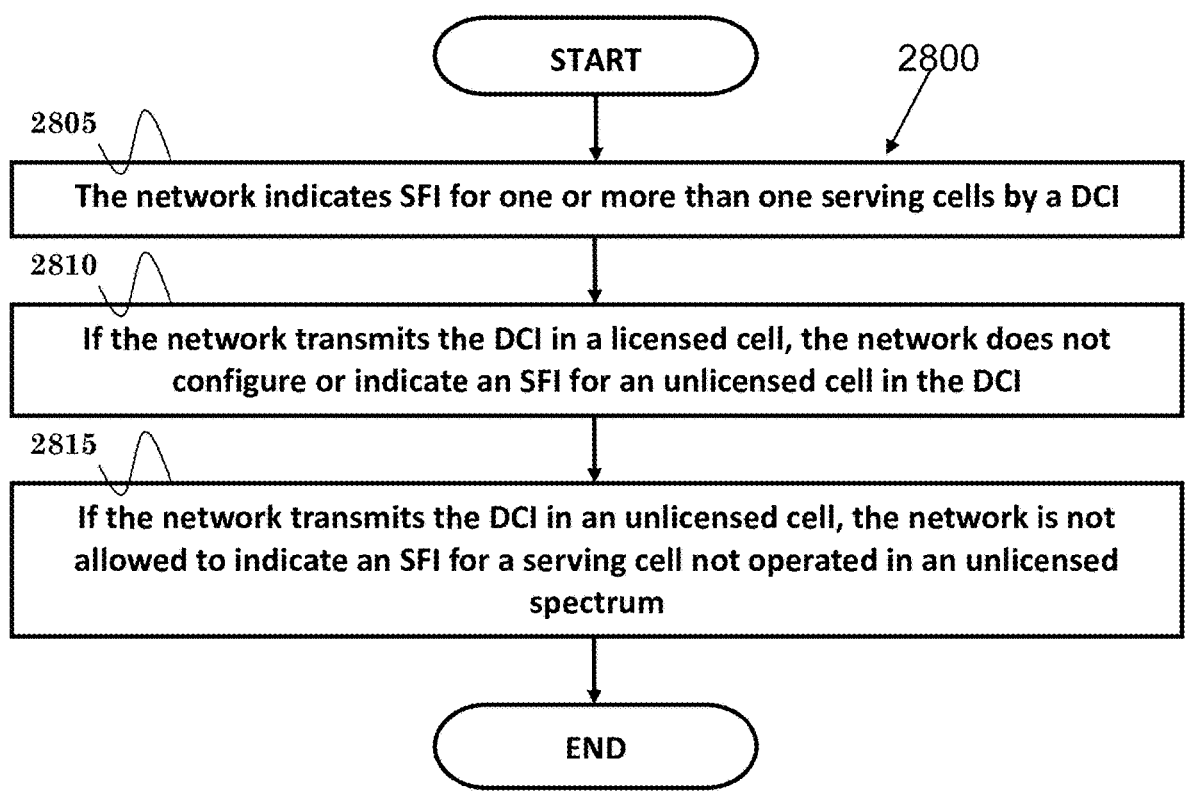
FIG. 28 is a flow chart according to one exemplary embodiment.

FIG. 28 is a flow chart 2800 according to one exemplary embodiment from the perspective of a network. In step 2805, the network indicates SFI for one or more than one serving cells by a DCI. In step 2810, if the network transmits the DCI in a licensed cell, the network does not configure or indicate an SFI for an unlicensed cell in the DCI. In step 2815, if the network transmits the DCI in an unlicensed cell, the network is not allowed to indicate an SFI for a serving cell not operated in an unlicensed spectrum.

In one embodiment, the network may not be allowed to configure a licensed serving cell indicating or transmitting an SFI for an unlicensed cell. Furthermore, the network may not be allowed to configure an unlicensed serving cell indicating or transmitting an SFI for a serving cell not operated in unlicensed spectrum. In addition, the network may not be allowed to transmit a DCI format 2_0 in a licensed cell indicating slot format for an unlicensed cell.

In one embodiment, if a network configures a UE to receive a DCI format 2_0 in an unlicensed serving cell, the network may not be allowed to configure SFI of serving cells other than the unlicensed cell is indicated by the DCI format 2_0. Furthermore, if a network configures a UE to receive a DCI format 2_0 in an unlicensed serving cell, the network may not be allowed to configure SFI of (serving) cells other than the licensed cell is indicated by the DCI format 2_0.

In one embodiment, the SFI could indicate a slot combination for a serving cell. A slot combination could comprise one or more than one slot format value. A slot format value could indicate slot format of a slot, and/or transmitted direction or functionality of each OFDM symbols in a slot. The DCI could be DCI format 2_0. The SFI received in a monitoring occasion of the DCI could at least indicate slot format of slots from the slot aligning beginning of the monitoring occasion of the DCI to next monitoring occasion of the DCI.

Referring back to FIGS. 3 and 4, in one exemplary embodiment of a network, the device 300 includes a program code 312 stored in the memory 310. The CPU 308 could execute program code 312 to enable the network (i) to indicate SFI for one or more than one serving cells by a DCI, (ii) to not be configured or indicate an SFI for an unlicensed cell in the DCI if the network transmits the DCI in a licensed cell, and (iii) to not be allowed to indicate an SFI for a serving cell not operated in an unlicensed spectrum if the network transmits the DCI in an unlicensed cell. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a User Equipment (UE), comprising:
   receiving configuration of a first serving cell and configuration of a second serving cell from a network, wherein the first serving cell is in licensed spectrum and the second serving cell is in unlicensed spectrum;
   receiving configuration indicating the UE to monitor and/or receive a Downlink Control Information (DCI) periodically in the first serving cell, wherein the DCI indicates a first Slot Format Indication (SFI) for the first serving cell and a second SFI for the second serving cell; and
   ignoring performing configured physical channel and/or Reference Signal (RS) reception on at least one symbol, indicated by the second SFI as flexible, on the second serving cell if the DCI is received outside a channel occupancy time for the second serving cell.

2. The method of claim 1, further including discarding the second SFI indicated in the DCI if the DCI is received outside the channel occupancy time for the second serving cell.

3. The method of claim 1, wherein the UE ignoring the second SFI indicated in the DCI comprises that the UE does not apply the second SFI for the second serving cell.

4. The method of claim 1, wherein the UE detects or is indicated that the network starts the channel occupancy time by receiving a channel indicator.

5. The method of claim 4, wherein the channel indicator is Demodulation Reference Signal (DMRS) of a Control Resource Set (CORESET).

6. The method of claim 4, wherein the channel indicator is a common signal or a group common signal.

7. The method of claim 4, wherein the channel indicator is transmitted by the network after or in response to the network occupying an unlicensed channel.

8. The method of claim 4, wherein the channel indicator is transmitted by the network after or in response to the network performing a channel access procedure successfully.

9. A User Equipment (UE), comprising:
a memory; and
a processor operatively coupled to the memory, wherein the processor is configured to execute program code to:
receive configuration of a first serving cell and configuration of a second serving cell from a network, wherein the first serving cell is in licensed spectrum and the second serving cell is in unlicensed spectrum;
receive configuration indicating the UE to monitor and/or receive a Downlink Control Information (DCI) periodically in the first serving cell, wherein the DCI indicates a first Slot Format Indication (SFI) for the first serving cell and a second SFI for the second serving cell; and
ignore performing configured physical channel and/or Reference Signal (RS) reception on at least one symbol, indicated by the second SFI as flexible, on the second serving cell if the DCI is received outside a channel occupancy time for the second serving cell.

10. The UE of claim 9, wherein the processor is further configured to execute program code to discard the second SFI indicated in the DCI if the DCI is received outside the channel occupancy time for the second serving cell.

11. The UE of claim 9, wherein the UE ignoring the second SFI indicated in the DCI comprises that the UE does not apply the second SFI for the second serving cell.

12. The UE of claim 9, wherein the UE detects or is indicated that the network starts the channel occupancy time by receiving a channel indicator.

13. The UE of claim 12, wherein the channel indicator is Demodulation Reference Signal (DMRS) of a Control Resource Set (CORESET).

14. The UE of claim 12, wherein the channel indicator is a common signal or a group common signal.

15. The UE of claim 12, wherein the channel indicator is transmitted by the network after or in response to the network occupying an unlicensed channel.

16. The UE of claim 12, wherein the channel indicator is transmitted by the network after or in response to the network performing a channel access procedure successfully.

* * * * *